(12) United States Patent
Winker et al.

(10) Patent No.: US 6,710,831 B1
(45) Date of Patent: Mar. 23, 2004

(54) HIGH BRIGHTNESS TRANSFLECTIVE LCD AND METHOD USING TUNABLE MIRROR

(75) Inventors: Bruce Winker, Ventura, CA (US); William J. Gunning, Newbury Park, CA (US)

(73) Assignee: Rockwell Scientific Licensing, LLC, Thousand Oaks, CA (US)

( * ) Notice: Subject to any disclaimer, the term of this patent is extended or adjusted under 35 U.S.C. 154(b) by 300 days.

(21) Appl. No.: 09/676,138

(22) Filed: Sep. 29, 2000

(51) Int. Cl.$^7$ .................................................. G02F 1/13
(52) U.S. Cl. ........................................................ 349/115
(58) Field of Search ............................ 349/115, 77, 74, 349/113, 114

(56) References Cited

U.S. PATENT DOCUMENTS

| | | | |
|---|---|---|---|
| 4,093,356 A | 6/1978 | Bigelow | 350/338 |
| 4,398,805 A | 8/1983 | Cole | 350/345 |
| 5,146,355 A | 9/1992 | Prince et al. | 359/50 |
| 5,182,663 A * | 1/1993 | Jones | 349/113 |
| 5,504,603 A | 4/1996 | Winker et al. | 359/73 |
| 5,612,801 A * | 3/1997 | Winker | 349/119 |
| 5,731,886 A | 3/1998 | Taber et al. | 359/65 |
| 5,796,454 A | 8/1998 | Ma | 349/98 |
| 5,808,711 A | 9/1998 | Suppelsa et al. | 349/74 |
| 5,923,456 A | 7/1999 | Tench et al. | 359/266 |
| 5,982,465 A | 11/1999 | Saxena et al. | 349/119 |
| 6,008,871 A | 12/1999 | Okumura | 349/61 |
| 6,039,451 A | 3/2000 | Grave | 362/29 |
| 6,144,359 A | 11/2000 | Grave | 345/102 |
| 6,437,900 B1 * | 8/2002 | Cornelissen et al. | 359/246 |

FOREIGN PATENT DOCUMENTS

| | | | |
|---|---|---|---|
| JP | 05203937 A1 * | 8/1993 | 349/113 |
| JP | 10206844 | 7/1998 | |
| JP | 2000221544 | 11/2000 | |
| WO | WO3701789 | 1/1997 | |
| WO | WO9838547 | 9/1998 | |
| WO | WO0063745 | 10/2000 | |

OTHER PUBLICATIONS

Machine translation of 10–206844 pp. 1–20.*
Saji, T., et al., "Short–Term Hemodynamic Effect of a New Oral PGI$_2$ Analogue, Beraprost, in Primary and Secondary Pulmonary Hypertension," *Am. J. Cardio.* 78:244–247 (1996).
Sakoda, T., et al., "Myristoylation of endothelial cell nitric oxide synthase is important for extracellular release of nitric oxide," *Mol. Cell. Biochem.* 152:143–148 (1995).
Sandig, V., and Strauss, M., "Liver–directed gene transfer and application to therapy," *J. Mol. Med.* 74:205–212 (1996).
*Polarization Manipulation with Retarders*, Meadowlark Optics, p. 5.
*Polarization Spoken Here*, Meadowlark Optics, Nov. 6, 2000.
*Retarders*, Polarization Manipulation with Retarders, Meadowlark Optics, Jul. 20, 2000, p. 1–3.
*Seminar M–12; Supertwisted–Nematic LCDs*, Scheffer and Nehring, p. M–12/3–M12/39.
*Cholesteric Reflectors With a Color Pattern*,Wacker–Chemie Maurer, Kreuzer and Stohrer, SID 94 Digest, p. 399–402.

(List continued on next page.)

*Primary Examiner*—James A. Dudek
(74) *Attorney, Agent, or Firm*—Koppel, Jacobs, Patrick & Heyblk

(57) ABSTRACT

A Liquid Crystal Display (LCD) uses a tunable mirror in place of a partially reflective mirror. The tunable mirror has a controllable reflectivity and transmitance which allows the mirror to primarily reflect light when the LCD is operated in a reflective mode, and to primarily transmit light from a backlight when the LCD is operated in a transmissive mode.

6 Claims, 18 Drawing Sheets

OTHER PUBLICATIONS

*Control of Reflectivity and Bistability in Displays Using Cholesteric Liquid Crystals*, Yang, West, Chien and Doane, 1994 American Institute of Physics, p. 1331–1333.

*Seminar M–1, Supertwisted Nematic (STN) LCDS*, Scheffer and Nehring, 1994, p. M–1/3–M–1/5.

*Gray Scale and Contrast Compensator for LCDS Using Obliquely Oriented Anisotropic*, Taber, Hale, Winker and GunningIII, Skarohlid, Sampica and Seder.

*Liquid–Crystal Displays*, Christopher Booth and Peter Raynes, Jun. 1997.

*Seminar M–2 Active Matrix LCDS*, Robert L. Wisnief, 1994 p. M–2/3 –M–2/5.

*Zero Field, Multistable Cholesteric Liquid Crystal Displays*, Wu, Gao, Ma and Zhou, p. 476–479.

XP002204574.

\* cited by examiner

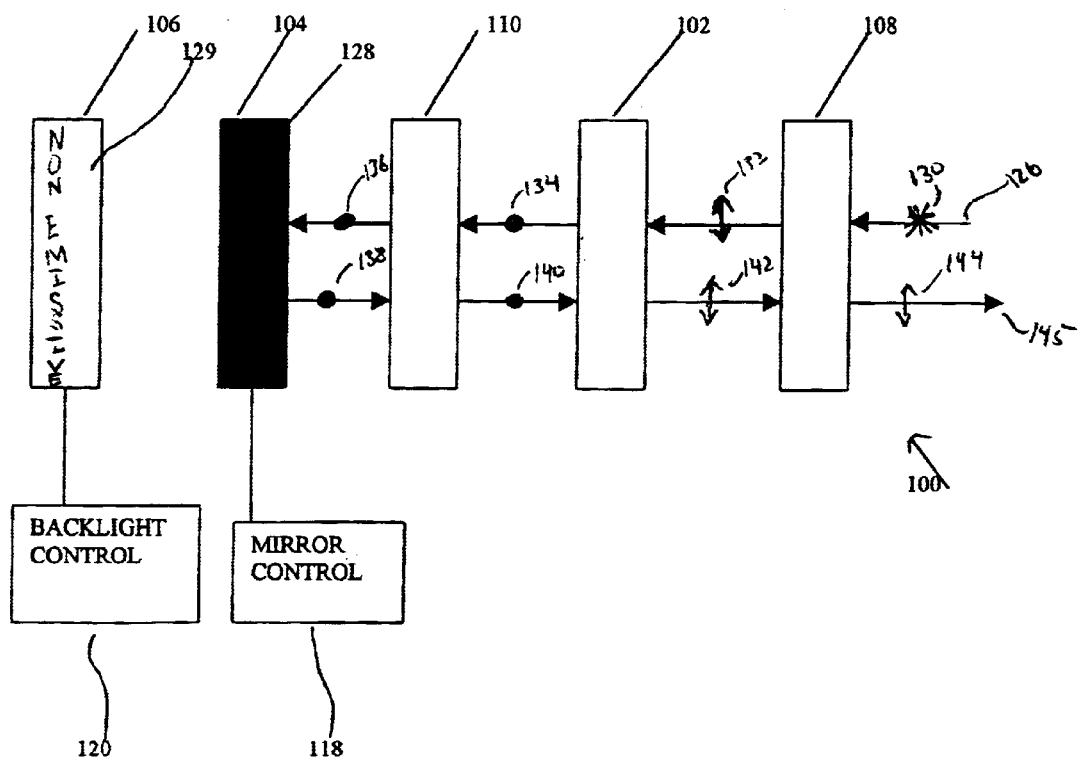
FIGURE 1 (LCD IN REFLECTIVE STATE)

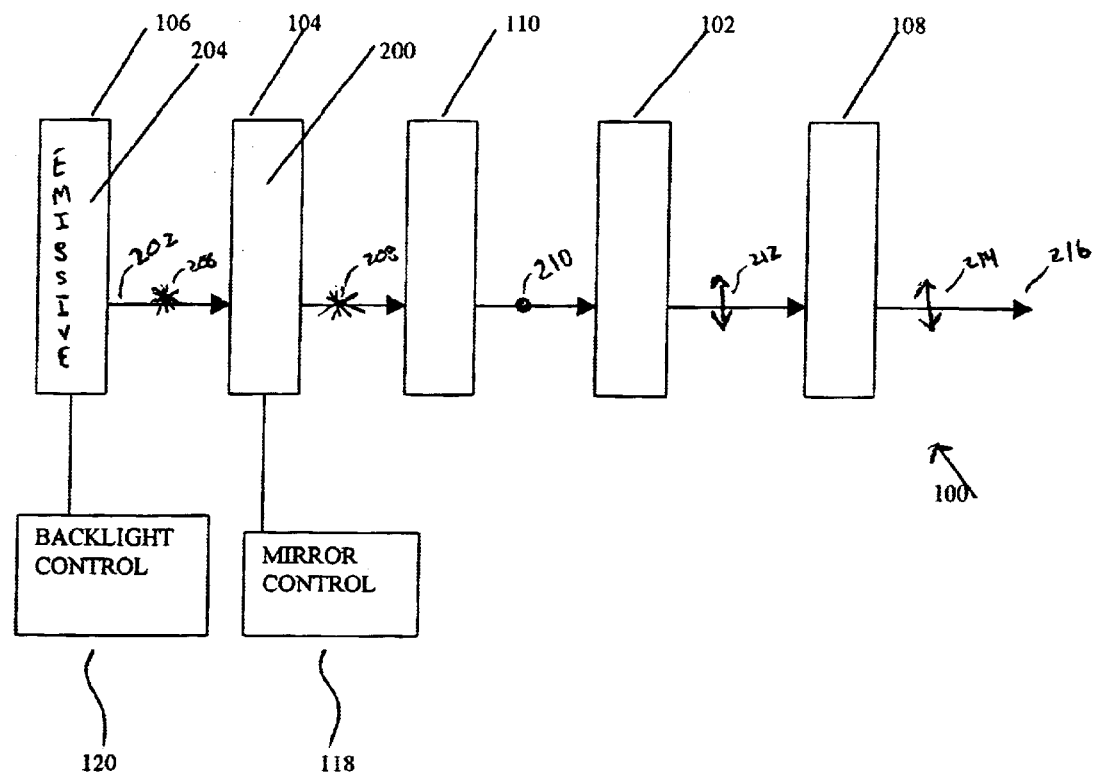
FIGURE 2 (LCD IN TRANSMISSIVE STATE)

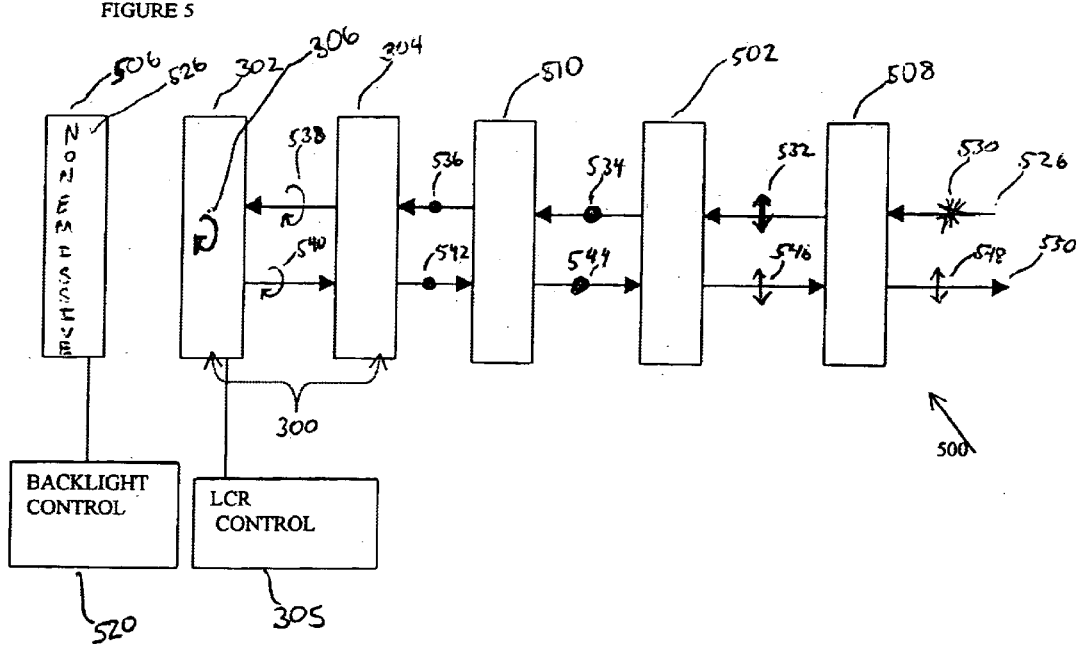

HIGH BRIGHTNESS TRANSFLECTIVE LCD AND METHOD USING TUNABLE MIRROR

BACKGROUND OF THE INVENTION

1. Field of the Invention

This invention is concerned with liquid crystal displays (LCDs) and particularly with transflective LCDs that achieve lower battery usage and higher contrast.

2. Description of the Related Art

Conventional transflective LCDs have a partially-reflective partially-transmissive mirror element (also known as a transflector) which reflects ambient light received from the viewing screen back through the LCD, and transmits backlight emission which is switched on when ambient lighting is low.

In conventional transflective LCDs, the utilization of light is inefficient because light is both reflected and transmitted at the same time, by the partially-reflective partially-transmissive mirror. Additionally, the transmission and reflection have fixed values. Since at any given time, the sum of the transmission and reflection of a mirror can not exceed 100%, the partially-reflective partially-transmissive mirror sacrifices efficiency by simultaneously operating as a reflector and a transmitter. Typically such mirrors have a 70–90% reflectance and a 10–30% transmission.

To compensate for such inefficiency, more battery power must be used to increase the backlight emission when operating in the transmissive mode in low ambient light. Likewise, contrast is lost when operating in the reflective mode, at high ambient light.

SUMMARY OF THE INVENTION

This invention provides a system and method which improve the efficiency of conventional transflective LCDs by replacing the partially-reflective partially-transmissive mirror with a tunable mirror. A tunable mirror is any device having controllable degrees of transmission and reflection.

The advantage of using a tunable mirror is that it can be switched between "reflective" and "transmissive" modes to primarily reflect light when ambient lighting is high, and to primarily transmit light when ambient lighting is low and backlighting is needed. This saves battery life by reducing the amount of backlighting needed when operating the LCD in the transmissive mode, and increases contrast and brightness when operating in the reflective mode.

The electrochemical reversible mirror (REM) is a suitable type of tunable mirror for use with this invention. Additionally, tunable mirrors may be constructed from a plurality of optical elements, at least one of which has an electrically switchable optical property.

One suitable construction for the tunable mirror includes a cholesteric liquid crystal reflector with a quarter-wave ($\lambda/4$) retarder. In this combination, the liquid crystal reflector is switchable between reflecting and transmitting states of operation to give the mirror its tunable characteristic.

Another suitable construction for the tunable mirror includes a reflective polarizer with a zero to half-wave ($0-\lambda/2$) tunable liquid crystal retarder. Such retarder is and is switchable between $\lambda/2$ and $0\lambda$ states of operation to give the mirror its tunable characteristic.

A third suitable construction for the tunable mirror includes a cholesteric reflector with a negative quarter-wave to positive quarter-wave ($+/-\lambda/4$) tunable liquid crystal retarder. Such retarder is switchable between $+\lambda/4$ and $-\lambda/4$ states of operation to give the mirror its tunable characteristic.

There are various possibilities for controlling the mirror and backlight. For example, mirror and backlight control systems may be employed which operate the mirror and backlight in tandem, such that when the backlight is switched on, the mirror is set to the transmissive state. Another possibility is to set the mirror and backlight controls automatically responsive to the level of ambient light.

BRIEF DESCRIPTION OF THE DRAWINGS

FIGS. 18a–18c are perspective views illustrating the appearance of electronic apparatus of the present invention, in which FIG. 18a is a cellular telephone, FIG. 18b is a watch, and FIG. 18c is a laptop computer.

DETAILED DESCRIPTION OF THE INVENTION

The present invention replaces the partially-reflective partially-transmissive mirror used in prior art transflective LCDs with a tunable mirror. There are many ways to make transflective LCDs. While a particular type of LCD is shown in these figures, the invention is applicable in general to any transflective LCD in which the partially-reflective partially-transmissive mirror can be replaced by a tunable mirror.

Figure 1:
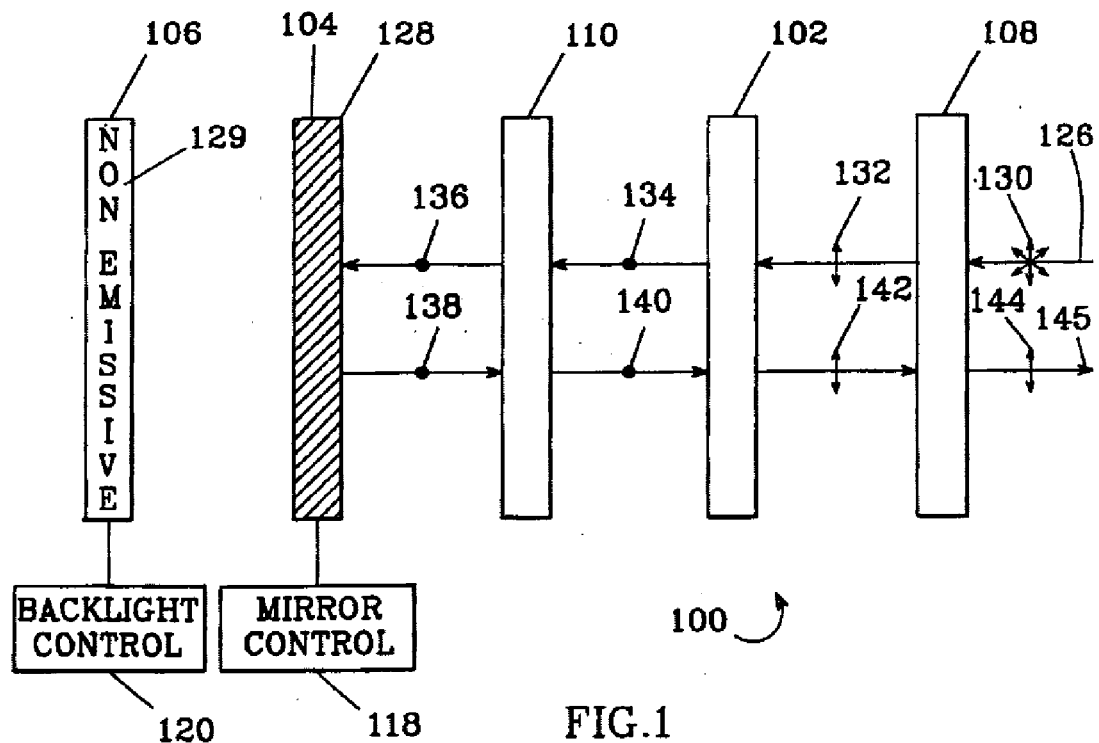
FIG. 1 is a schematic diagram of an LCD in accordance with the present invention LCD operating in the reflective mode.
Figure 2:
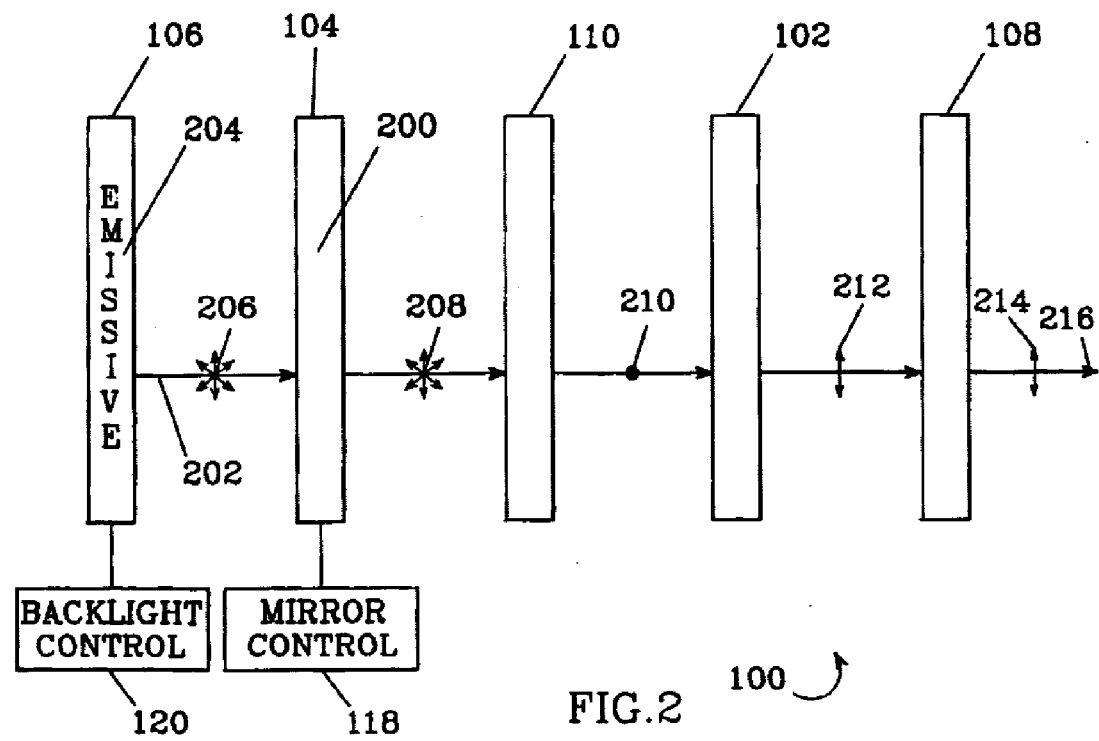
FIG. 2 is a schematic diagram of the LCD of FIG. 1, operating in the transmissive mode.
Figure 3:
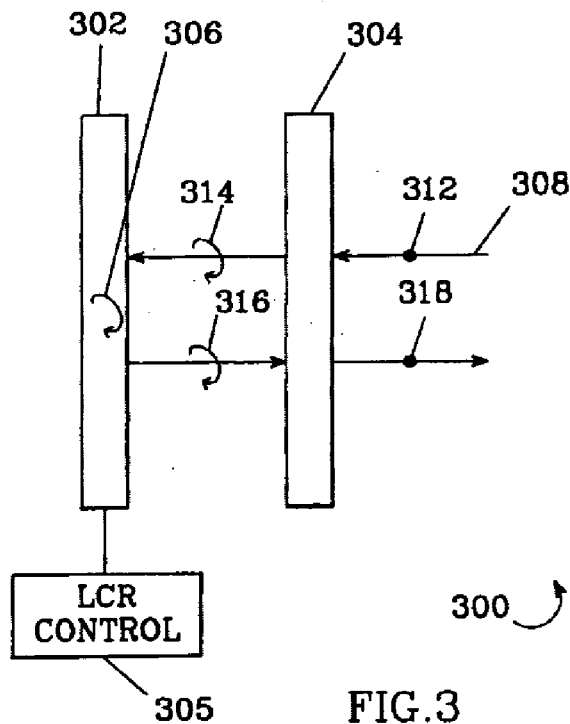
Figure 4:
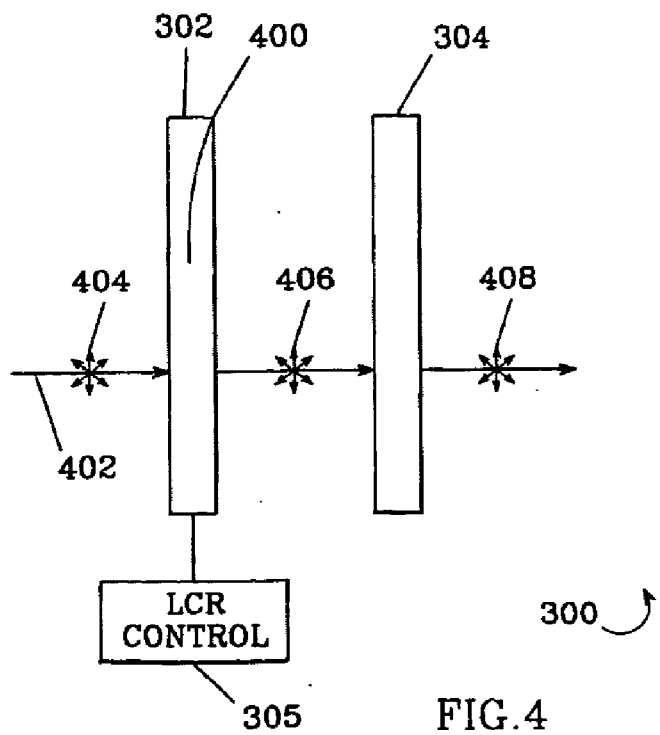

FIGS. 1 and 2 are diagrams illustrating an LCD 100, according to the present invention, operating in the reflective and transmissive mode, respectively.

The LCD 100 includes a liquid crystal cell 102; a tunable mirror 104 behind the cell; a backlight 106 which is located behind the tunable mirror 104; a first polarizer 108 in front of the cell 102; a second polarizer 110 between the cell 102 and the tunable mirror 104; a control 118 for the tunable mirror 104; and a control 120 for the backlight 106.

The liquid crystal cell 102 may be a Supertwisted-Nematic (STN) cell, an Active Matrix Twisted-Nematic (TN) cell or a Passive TN cell. The construction of the liquid crystal cell typically includes a liquid crystal layer sandwiched between a pair of segmented electrodes.

In a normally white mode of operation, the cell 102 can be either in an ON (light emitting) state or an OFF state, wherein voltage is applied across the electrodes of the cell in the OFF state and no voltage is applied across the cell in the ON state. The first and second polarizers 108 and 110 are oriented such that when the cell is in the ON state, light entering through one polarizer is rotated upon transmission through the cell, such that the polarization direction is approximately parallel to the transmission axis of the other polarizer, and exits through that polarizer. When the cell is in the OFF state, light entering through one polarizer is rotated by the cell, such that the polarization direction is approximately orthogonal to the transmission axis of the other polarizer, and is therefore blocked or absorbed by that polarizer. In the example of a 90° TN cell operating in the normally white mode where the cell rotates light by 90° in the ON state, the polarizers have mutually orthogonal planes of polarization.

In an STN cell the planes of polarization may not be orthogonal. A normally black mode may also be used, in which the voltage is applied in the ON state and no voltage in the OFF state. In the example of a 90° TN cell operating in the normally black mode the polarizers are parallel (For a reference on STN cells see T. J. Scheffer and J. Nehring, "Supertwisted Nematic LCDs," Society for Information Display Seminar Lecture Notes, Vol. 1, M-12, May 15, 2000, and the references therein.)

The tunable mirror 104 can be switched between reflective and transmissive modes, for primarily reflecting or primarily transmitting light, respectively. More detailed examples of tunable mirrors will be described below.

The backlight 106 can be switched between emissive and non-emissive states of operation, for emitting light in its emissive state when ambient light entering the liquid crystal cell from the opposite side is too low, and is therefore below a "viewability threshold". Some examples of a suitable backlight assembly can be found in Okumara, (U.S. Pat. No. 6,008,871). Additionally, manufacturers of suitable backlights for transflective displays are Durel Corporation and Eltech.

While the liquid crystal cell 102, tunable mirror 104, polarizers 108 and 110 are illustrated as being separated, this is for convenience of illustration; in practice these elements would normally be bonded together with adhesives having compensatory indices of refraction. The construction of these individual elements is well known in the LCD art. For example, see Okumara, (U.S. Pat. No. 6,008,871); and transflective LCD units having these components (with a partially-reflective partially-transmissive mirror) are sold by companies such as Seiko-Epson and Optrex.

Besides those illustrated, other optional elements are left out of the illustrations because they are not necessary to describe the present invention. These include compensation (retardation) films, which can be located on each side of the liquid crystal cell 102, and are used with an STN cell. Such elements are well known.

Additionally, a light diffusing element may be added to produce a diffused image. Such light diffusing element can be made of embossed plastic plate, or a plastic plate dispersed with beads. In addition, diffusing beads can be mixed into one of the adhesive layers adjacent to any of the above-described elements (See Okumura). Also, it may be possible to produce a tunable mirror with a matte surface for obtaining a diffused surface, and some mirrors may have an inherent light diffusion quality so an additional light diffusing element is not required for diffusion, as will be mentioned in more detail in the discussion regarding tunable mirrors.

Moreover, in conventional transflective LCDs, the backlight is switched to the emissive state when operating in a transmissive mode. In the present invention, both the backlight and tunable mirror need to be controlled. There are several options for this. The mirror and backlight controls 118 and 120 can be either manually set by the user or automatically responsive to the level of ambient light. The user may also be given the option of setting the controls at either manual or automatic ambient light responsive modes. In a system which is automatically responsive to ambient light, an ambient light sensor can be used to switch the backlight to its emissive state and set the mirror in its transmissive mode at low ambient light, and at high ambient light, switch the backlight to its non-emissive state and set the mirror in its reflective mode, for example. Additionally, the two controls 118 and 120 may either operate independently of each other, or in tandem. Where both controls are operated by applying a source of electrical potential, two control circuits operating in series or parallel may be utilized.

FIG. 1 illustrates the operation of the LCD 100 in the reflective mode in which there is high ambient light, and the tunable mirror 104 is switched to operate in the reflective mode, indicated by the shading 128. Additionally, the backlight 106 is switched to the non-emissive state of operation 129. For the purpose of illustration, the liquid crystal cell 102 is assumed to be a 90° TN cell operating in a normally white mode, and in its ON state, wherein it rotates the plane of polarization of linearly polarized light by 90°. Additionally, for the purpose of illustration, polarizers 108, 110 have mutually orthogonal planes of polarization in the vertical and horizontal directions, respectively. Although this assumption may not be true for all displays, as in the case of an STN cell, or a normally black mode display, it is adopted for the purpose of simplifying the illustration and does not limit the invention to TN cells or white mode displays.

First, randomly polarized ambient light 126, indicated by unpolarized light vectors 130, travels through the first polarizer 108, where it is linearly polarized, as indicated by the polarized light vector 132. The light then travels through the liquid crystal cell 102, where it is rotated to have a plane of polarization approximately parallel to the transmission axis of the second polarizer, indicated by the dot 134 representing a light vector coming out of the plane of the paper. The light then passes through the second polarizer 110, maintaining its linear polarization 136, and is primarily reflected by the tunable mirror 128. The reflected light then follows a reversed path with successive polarizations 138, 140, 142 and 144, to emerge as an LCD output 145. (When the cell 102 is in the OFF state, the light entering through the first polarizer 108 travels through the cell 102, where it is rotated to have a plane of polarization approximately orthogonal to the transmission axis of the second polarizer and is blocked.)

FIG. 2 illustrates the operation of the LCD 100 in the transmissive mode, in which the tunable mirror 104 is switched to operate in the transmissive mode, indicated by the absence of shading 200. Additionally, the backlight 106 is switched to the emissive state of operation 204. As in the description of FIG. 1, the liquid crystal cell 102 is again assumed to rotate the plane of polarization of linearly polarized light by 90°. First, randomly polarized backlight emission 202, indicated by unpolarized light vectors 206, is primarily transmitted through the tunable mirror 104. The resultant unpolarized light, indicated by vector 208, then travels through the second polarizer 110 and is linearly polarized 210. Its polarization is then rotated by the liquid crystal cell 102 to a linear polarization 212, approximately parallel to the transmitting axis of the first polarizer 108. Finally the light exits the first polarizer 108 with linear polarization 214, to emerge as the LCD output 216. (When the liquid crystal cell 102 is in the OFF state, the light exiting the cell 102 has a polarization direction orthogonal to the transmitting axis of the first polarizer 108 and is blocked.)

TUNABLE MIRRORS

For purposes of this invention, a tunable mirror is defined as any device having a controllable transmission and reflection. This includes a transmission/reflection which can be switched among either discrete or continuous states. An electro-optic device is one whose optical properties change with an electric signal. This invention contemplates the use of any electro-optic or other device which acts as a tunable mirror for a transflective LCD.

Tench (U.S. Pat. No 5,923,456) discloses a suitable reversible electrochemical mirror (REM) having controllable reflective and transmissive modes. The REM can be controlled by applying a source of electrical potential which has reversible polarity and adjustable potential. The REM takes about 1 second to switch between reflective and transmissive modes. Additionally, the REM may have a matte surface to produce a diffused reflectance. The REM can achieve a transmittance of up to 60% due to light absorption, and therefore has limited efficiency.

Additionally, tunable mirrors may be constructed by combining a plurality of optical elements, at least one of which is an electro-optic device having switchable optical properties. FIGS. 3–17 illustrate examples of such tunable mirrors, and LCDs incorporating these mirrors, according to this invention.

FIGS. 3–6 illustrate a first tunable mirror assembly 300, and an LCD 500 incorporating the tunable mirror 300. The tunable mirror 300 includes a switchable cholesteric liquid crystal reflector 302 with a quarter-wave ($\lambda/4$) retarder 304 and a control 305 for the liquid crystal reflector 302. The liquid crystal reflector 302 is controllably switchable between reflecting and transmitting states of operation, for reflecting circularly polarized light of a particular rotational direction in the reflecting state, and for transmitting light in the transmitting state. Such Cholesteric liquid crystal devices are commercially available from Kent Displays and Advanced Display Systems (ADS). Preferably, the cholesteric liquid crystal reflector 302 should be custom designed to have a single addressing pixel, which has the same dimensions as the overall LCD. Such liquid crystal reflector has a diffuse reflectance in the reflecting state and thus will produce a diffused image without the addition of a light diffusing element. When a voltage (approximately between 20 and 80 Volts) is applied to the reflector 302 (i.e. in the transmitting state) it changes from a homeotropic state, in which light is transmitted without a change in polarization. (For a reference see D. K. Yang, J. L. West, L. C. Chien, and J. W. Doane, "control of Reflectivity and Bistability in Displays using Cholesteric Liquid Crystals," J. Appl. Phys. 76, 1331 (1994)).

The $\lambda/4$ retarder 304 is an element used for conversion of light between circular and linear polarization forms. It converts horizontal or vertical linearly polarized light to right-handed or left-handed circularly polarized light, depending on the orientation. Conversely, it will convert right-handed or left-handed circularly polarized light to linearly polarized light, and is substantially transmissive to randomly polarized light. Such $\lambda/4$ retarder can be either birefringent crystal or oriented polymer film and are manufactured by Fuji Film, Nitto Denko, and Meadowlark Optics. (For a reference see Polarization Manipulation with Retarders, Meadowlark Optics, Product Catalogue, 1999–2000). Furthermore, the liquid crystal reflector 302 and $\lambda/4$ retarder 304 are oriented with respect to each other such that in the reflective mode, the reflector 302 reflects light received from the retarder 304. Also, in FIGS. 3–6, the liquid crystal reflector 302 and $\lambda/4$ retarder 304 are illustrated as being separated, however, as components of an LCD, these elements would normally be bonded together.

Figure 3:
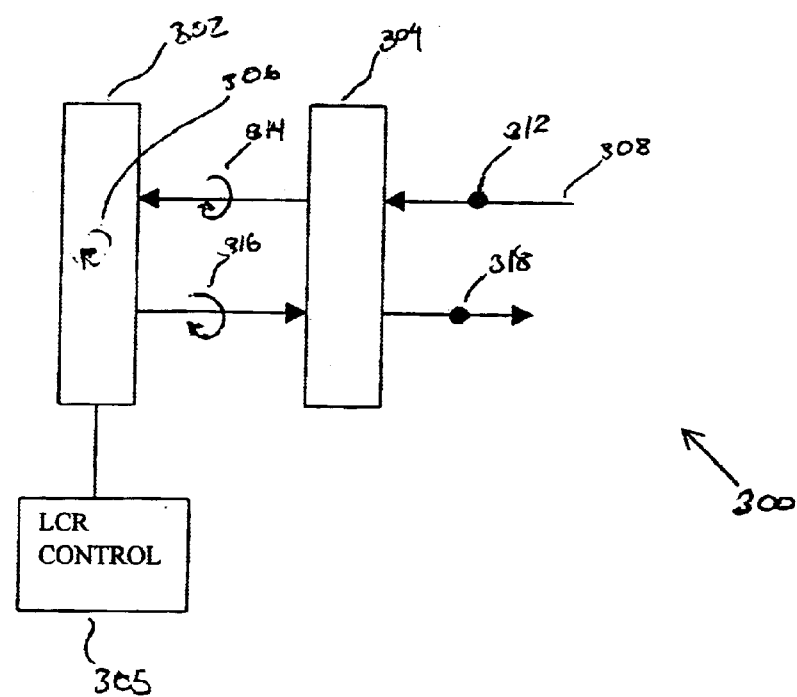
FIG. 3 is a schematic diagram of a tunable mirror comprising a liquid crystal reflector and quarter waver retarder, operating in the reflective mode.

FIG. 3 illustrates the operation of the tunable mirror 300 in the reflective mode in which the liquid crystal reflector 302 is in the reflecting state. In this state, the liquid crystal reflector 302 is capable of reflecting circularly polarized light of one particular rotational direction, e.g. right handed circular polarization but not left handed, indicated by the circular reflection vector 306.

First, linearly polarized light 308 (e.g. in the horizontal direction), as indicated by the polarized light vector 312, is converted by the $\lambda/4$ retarder 304 to a circular right handed polarization, indicated by the polarized light vector 314. The light is then reflected by the liquid crystal reflector 302, maintaining its circular right handed polarization 316, and travels back through the $\lambda/4$ retarder 304 which converts it back to a horizontal linear polarization 318.

Figure 4:
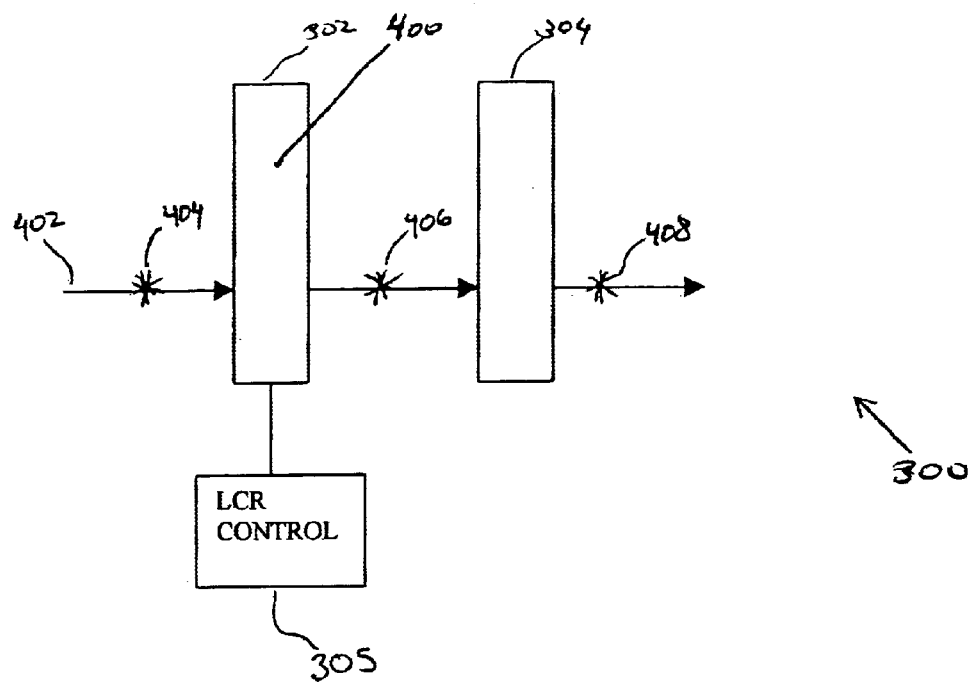
FIG. 4 is a schematic diagram of the tunable mirror of FIG. 3 operating in the transmissive mode.

FIG. 4 illustrates the operation of the tunable mirror 300 in the transmissive mode, in which the liquid crystal reflector 302 is in the transmitting state. In this state the liquid crystal reflector is transmits light, as indicated by the absence of a reflection vector 400. Randomly polarized light 402, indicated by the unpolarized light vectors 404, is transmitted through both the liquid crystal reflector 302 and $\lambda/4$ retarder 304, maintaining its random polarization indicated by vectors 406 and 408.

Figure 6:
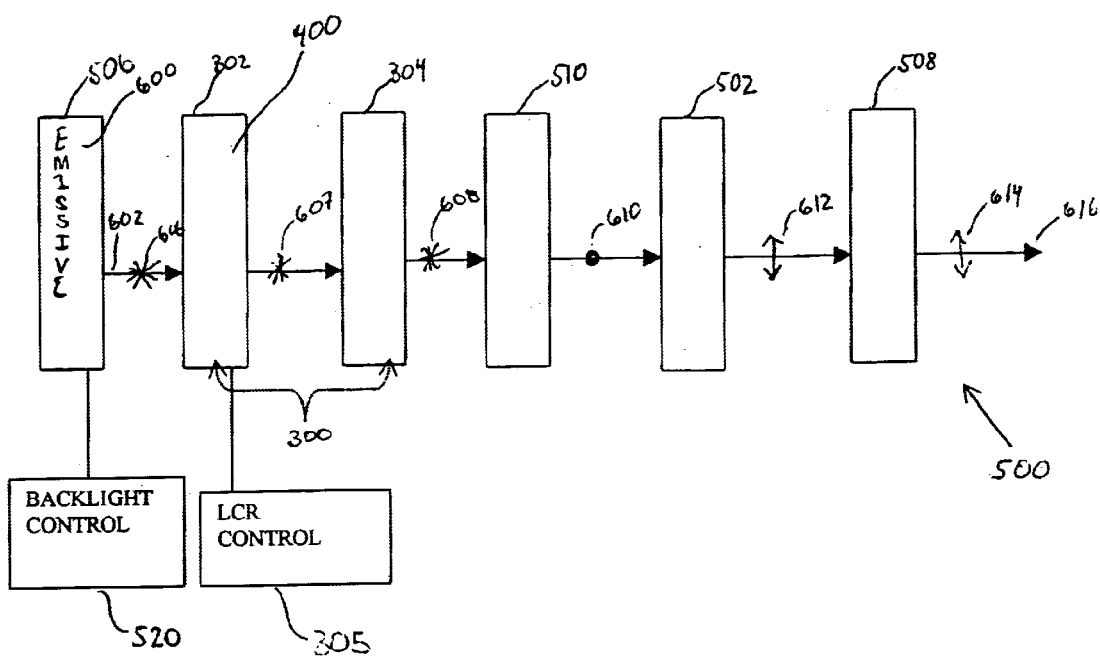
FIG. 6 is a schematic diagram of the LCD of FIG. 5 operating in the transmissive mode.
Figure 5:
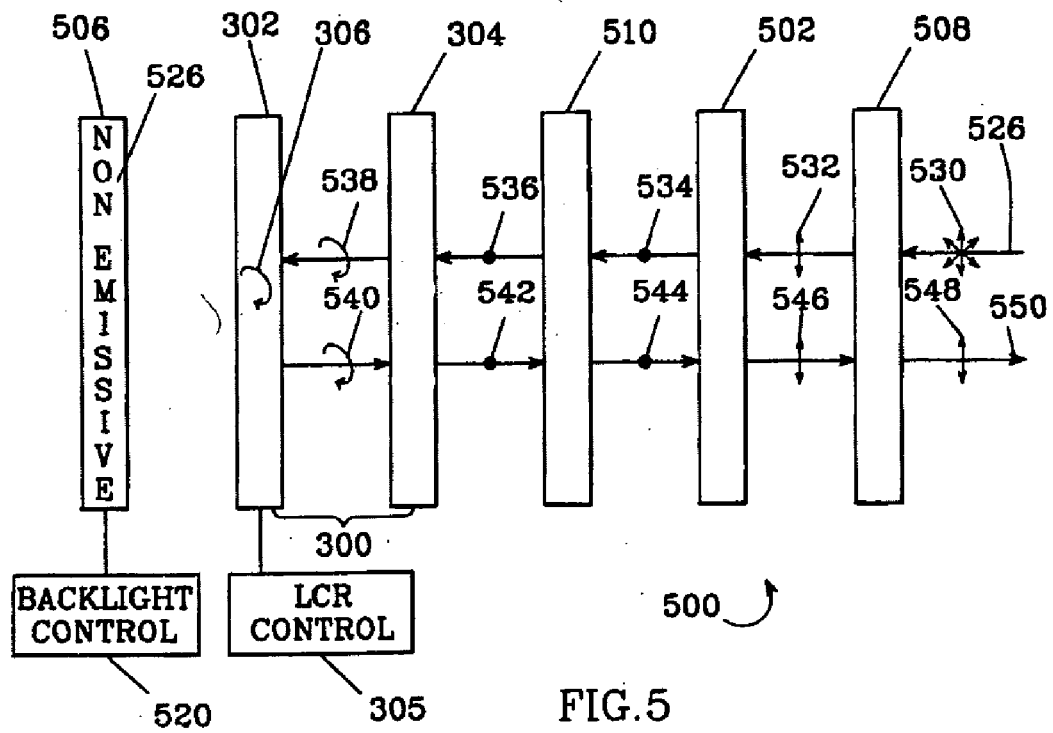
FIG. 5 is a schematic diagram of an LCD with the tunable mirror of FIG. 3 operating in the reflective mode.
Figure 6:
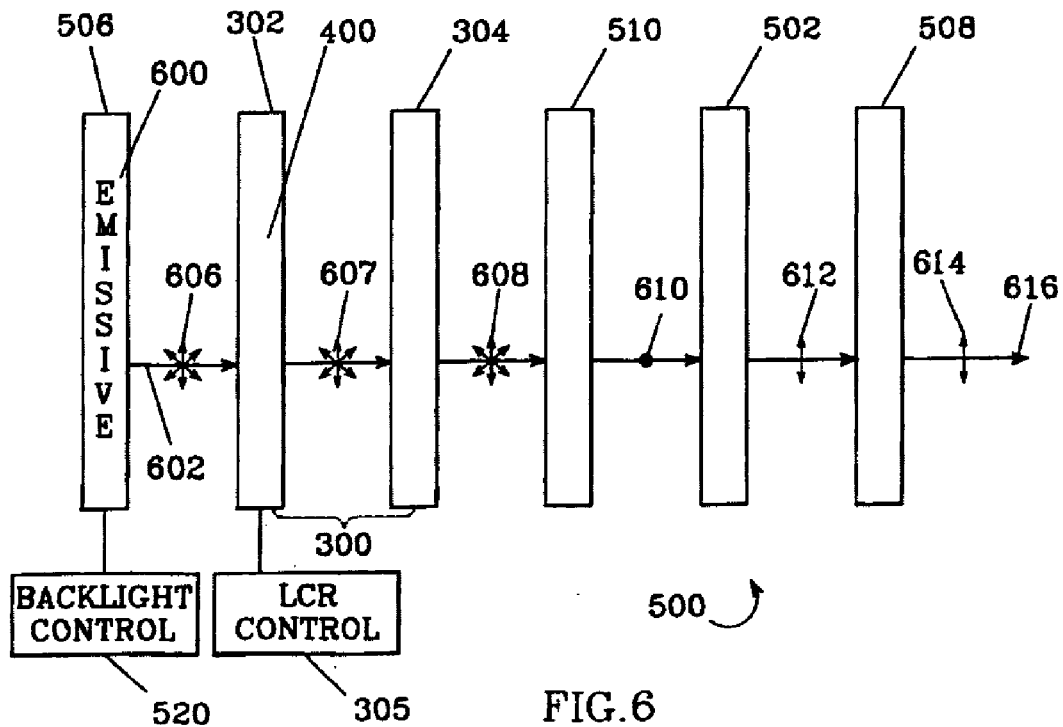
Figure 7:
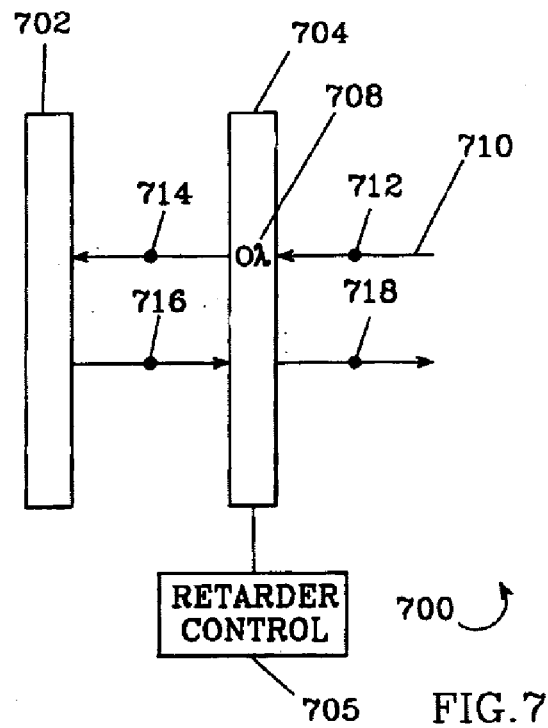
Figure 8:
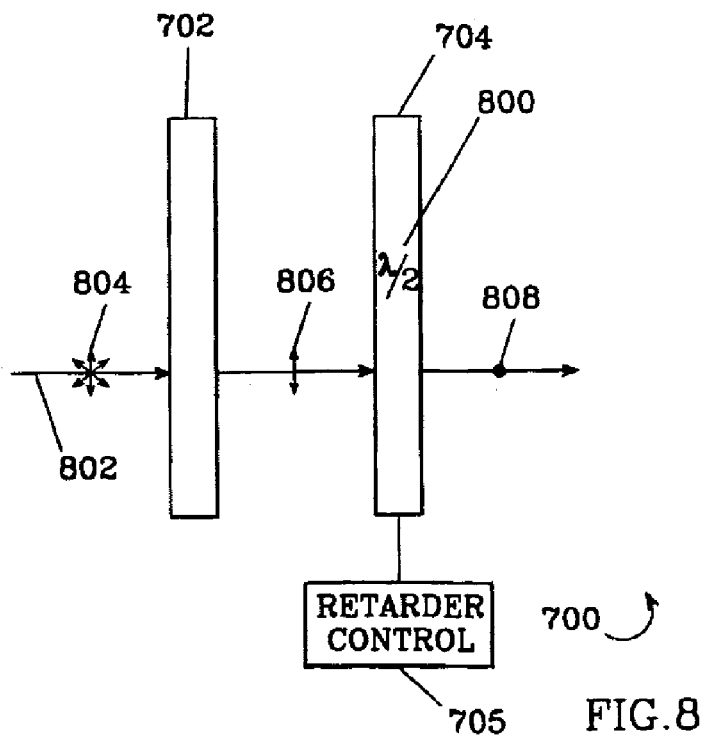
Figure 9:
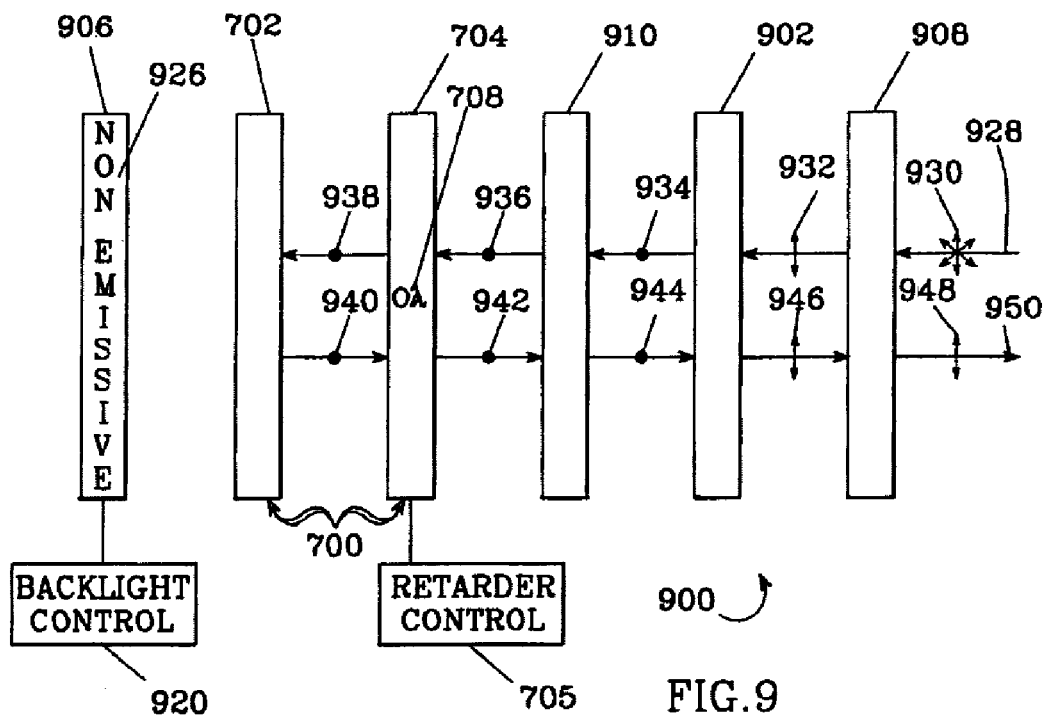
Figure 10:
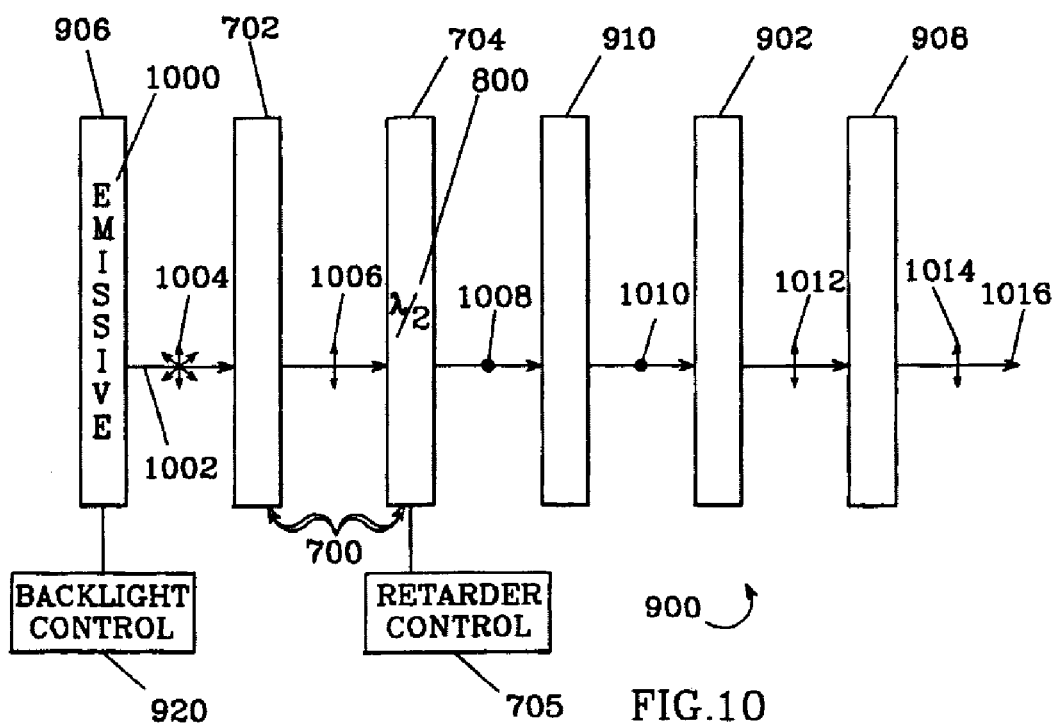
Figure 11:
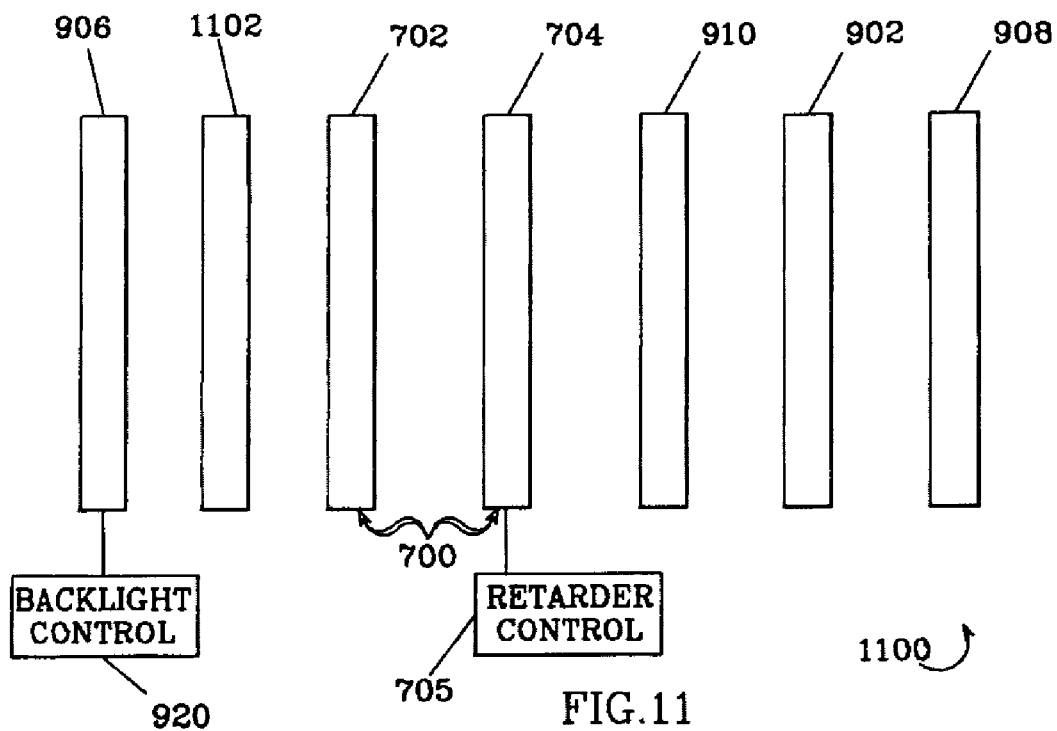
Figure 12:
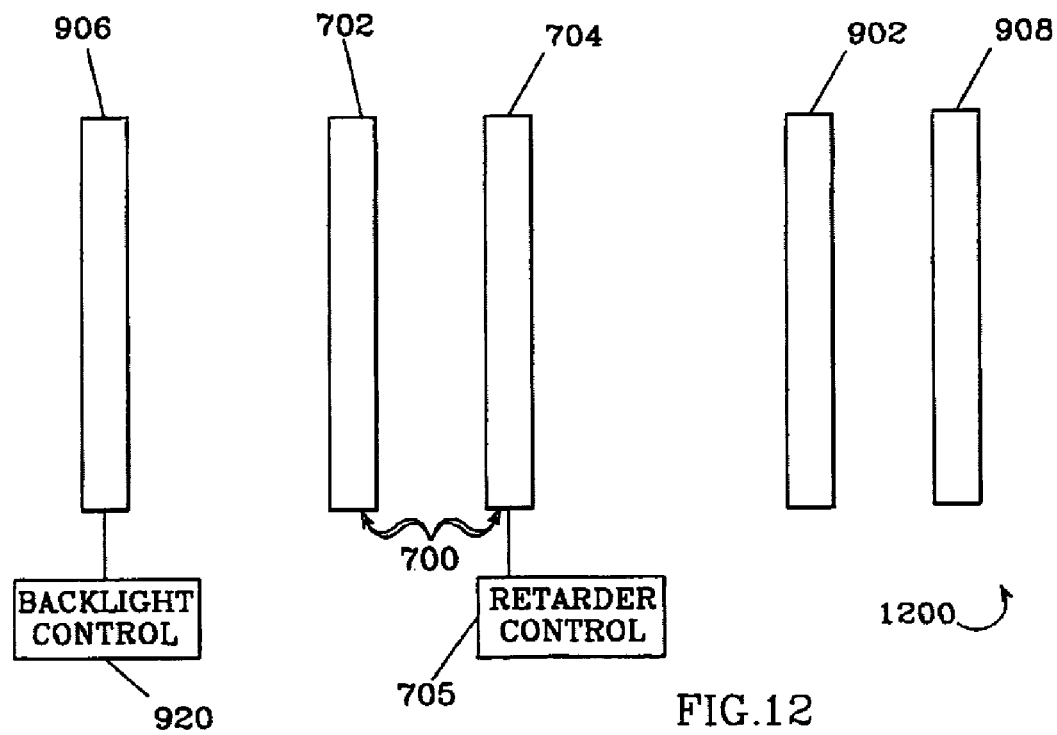
Figure 13:
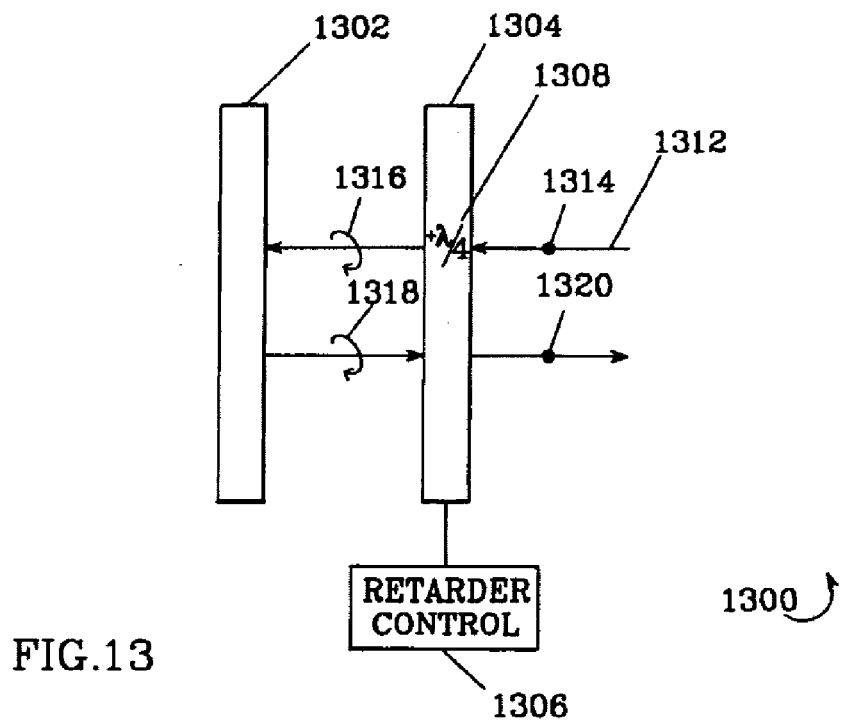
Figure 14:
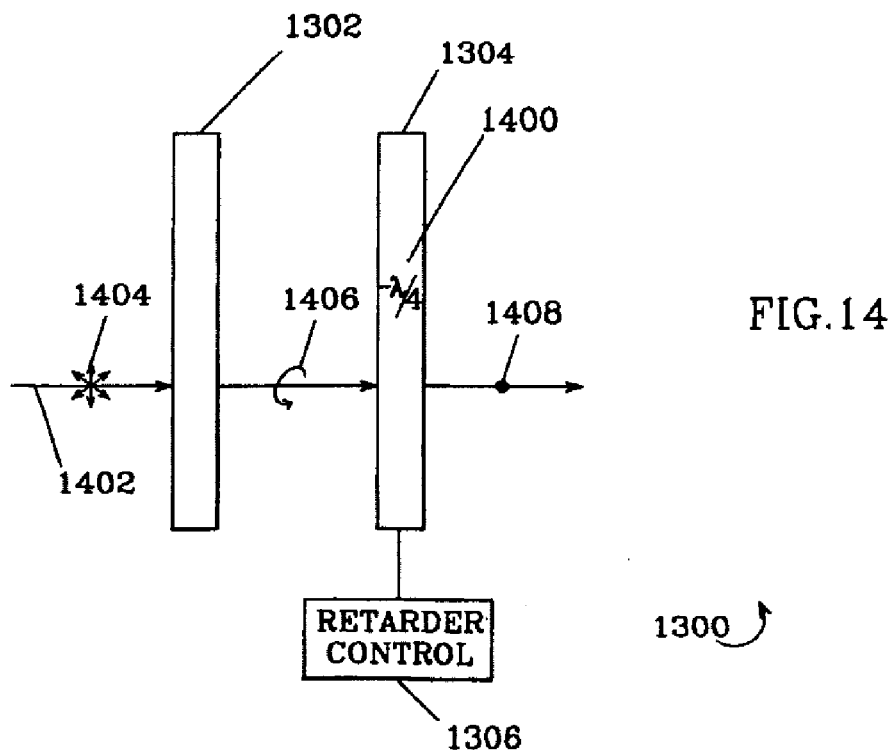

FIGS. 5 and 6 illustrate the operation of the LCD 500 which incorporates the tunable mirror 300. The elements of the LCD 500 are essentially the same as those in the previous figures, with the exception of the tunable mirror, and tunable mirror control. These elements are a liquid crystal cell 502 located in front of the $\lambda/4$ retarder 304 of the tunable mirror 300; a backlight 506 which is located behind the liquid crystal reflector 302 of tunable mirror 300 and can be switched between emissive and non-emissive states; a first polarizer 508 in front of the cell 502; a second polarizer 510 between the cell 502 and the $\lambda/4$ retarder 304; and a control 520 for the backlight 506. Again, for the purpose of illustration, the liquid crystal cell 502 is assumed to be a 90°

TN cell operating in the normally white mode, and in its ON state wherein it rotates the plane of polarization of linearly polarized light by 90°. Also for the purpose of illustration, the first and second polarizers 508 and 510 have mutually orthogonal planes of polarization in the vertical and horizontal directions, respectively.

FIG. 5 illustrates the LCD 500 operating in the reflective mode, in which the liquid crystal reflector 302 is in the reflecting state, as indicated by the circular reflection vector 306, and the backlight 506 is in the non-emissive state 526. First, randomly polarized ambient light 526, indicated by unpolarized light vectors 530, travels through the first polarizer 508, where it is linearly polarized, as indicated by the polarized light vector 532. The light then travels through the liquid crystal cell 502, where its is rotated to have a plane of polarization approximately parallel to the transmission axis of the second polarizer, as indicated by the polarized light vector 534 and through the second polarizer 510, maintaining its linear polarization 536. The light then passes through the $\lambda/4$ retarder 304 wherein it is circularly polarized in the right handed direction 538. The circularly polarized light 538 is then reflected by liquid crystal reflector 302, following a reversed path with successive polarizations 540, 542, 544, 546, and 548 to emerge as an LCD output 550. (When the liquid crystal cell 502 is in the OFF state, the light entering through the first polarizer 508 travels through the cell 502, where it is rotated to have a plane of polarization approximately orthogonal to the transmission axis of the second polarizer 510 and is blocked.)

FIG. 6 illustrates the LCD 500 operating in the transmissive mode, in which the liquid crystal reflector is in the transmitting state, as indicated by the absence of a reflection vector 400, and the backlight is in its emissive state 600. First, randomly polarized backlight 602, indicated by unpolarized light vectors 606, is transmitted through the liquid crystal reflector 302 and $\lambda/4$ retarder 304, having unpolarized light vectors 607 and 608. The resultant light then travels through the second polarizer 510 and is linearly polarized 610. Its polarization is then rotated by the liquid crystal cell 502 to an approximately linear polarization 612, parallel to the transmitting axis of the first polarizer 508. Finally the light passes through the first polarizer 508 with linear polarization 614, to emerge as the LCD output 616. (When the liquid crystal cell 502 is in the OFF state, the light exiting the cell 502 has a polarization direction orthogonal to the transmitting axis of the first polarizer 508 and is blocked.)

FIGS. 7–12 illustrate a second tunable mirror assembly 700, and LCDs 900, 1100 and 1200 incorporating the tunable mirror 700. The tunable mirror 700 includes a reflective polarizer 702, a tunable liquid crystal zero to half-wave (0–$\lambda/2$) retarder 704, and a control 705 for the 0–$\lambda/2$ retarder 704. The reflective polarizer 702 reflects linearly polarized light of one direction, (e.g. the horizontal direction) and transmits linearly polarized light of another direction (e.g. the vertical direction). Commercially available reflective polarizers (supplied through Merck and 3M) have a specular rather then a diffuse reflectance.

The 0–$\lambda/2$ retarder 704 is controllably switchable between 0$\lambda$ and $\lambda/2$ states of operation, for rotating the plane of polarization of linearly polarized light by 90° in the $\lambda/2$ state, and for transmitting light with no change in the 0$\lambda$ state. (see Meadowlark Optics) Such retarder is typically of a nematic type, and is switchable to the 0$\lambda$ state with the application of a voltage (approximately 10V) at a speed of 20 ms, and works in analogue mode.

Furthermore, the reflective polarizer 702 and retarder 704 are oriented with respect to each other such that in the reflective mode, the reflective polarizer 702 reflects light received from the retarder 704, as illustrated in FIGS. 7–12. Also, in FIGS. 7–12, the reflective polarizer 702 and retarder 704 are illustrated as being separated, however, as components of an LCD, these elements would normally be bonded together. Additionally, in an LCD where a diffuse reflectance is desired, an additional light diffusing element may be added with this type of tunable mirror. In this case it is preferable to use a holographic diffuser that does not scramble the polarization.

Figure 7:
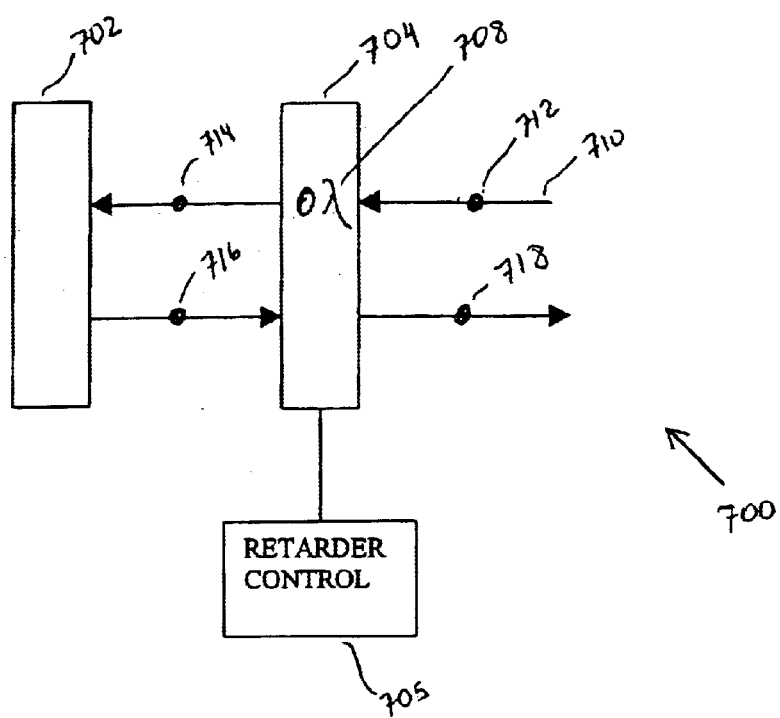
FIG. 7 is a schematic diagram of a tunable mirror comprising a reflective polarizer with a zero to half-wave ($0-\lambda/2$) tunable liquid crystal retarder, operating in the reflective mode.

FIG. 7 illustrates the operation of the tunable mirror 700 in the reflective mode, in which the 0–$\lambda/2$ retarder 704 is in the 0$\lambda$ state 708. In the simplest case, light having horizontal linear polarization 710 as indicated by the polarized light vector 712, is transmitted through the retarder 704 and reflected by the reflective polarizer 702, back through the retarder 704, having successive polarizations 714, 716, and 718. It is also possible for the light entering to have both vertical and linear polarization components. In this case, still only the component having horizontal linear polarization will be reflected back.

Figure 8:
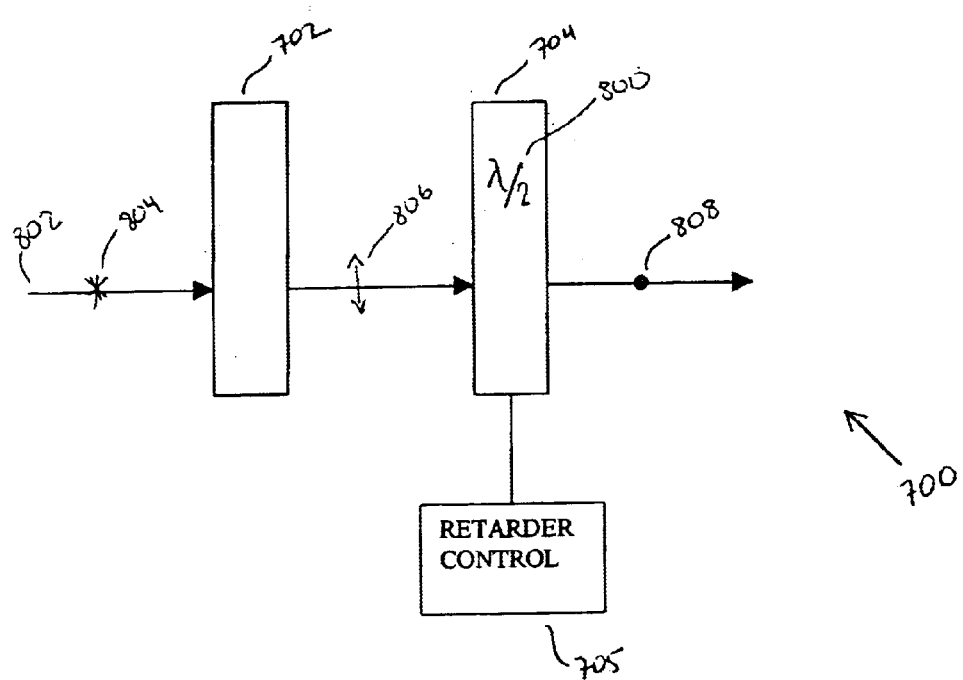
FIG. 8 is a schematic diagram of the tunable mirror of FIG. 7, operating in the transmissive mode.

FIG. 8 illustrates the operation of the tunable mirror 700 in the transmissive mode in which the retarder 704 is in the $\lambda/2$ state 800. First, randomly polarized light 802, as indicated by the unpolarized light vectors 804 is transmitted through the reflective polarizer 702, wherein only the vertical component is transmitted, as indicated by the polarized light vector 806. Thereafter, the light passes through the retarder, wherein its polarization is rotated 90°, as indicated by polarized light vector 808.

Figure 9:
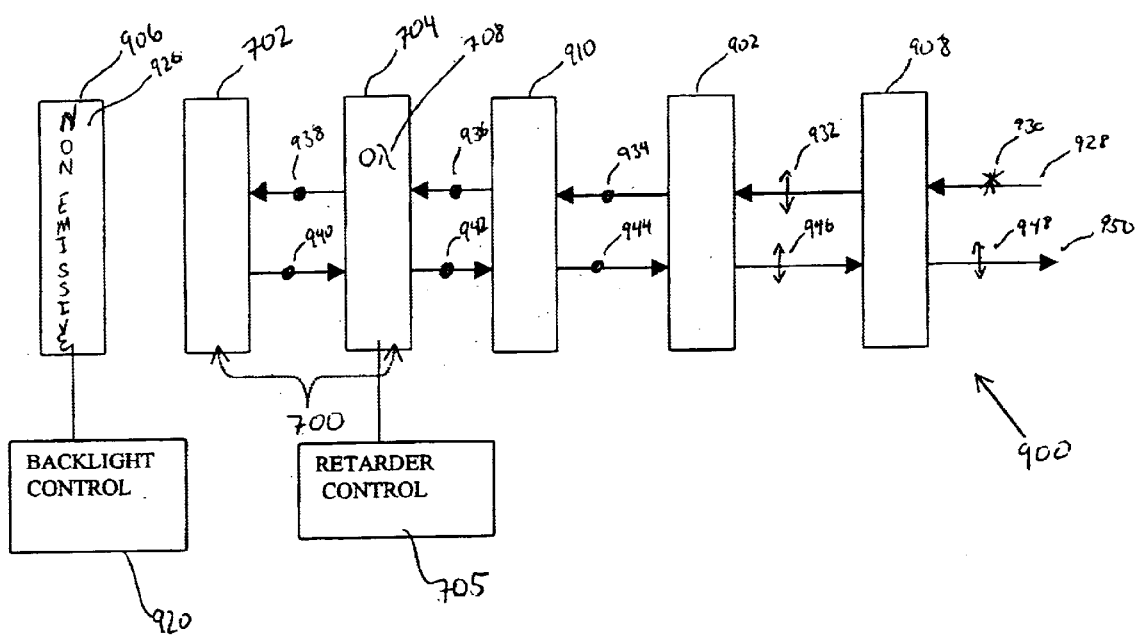
FIG. 9 is a schematic diagram of an LCD with the tunable mirror of FIG. 7, operating in the reflective mode.
Figure 10:
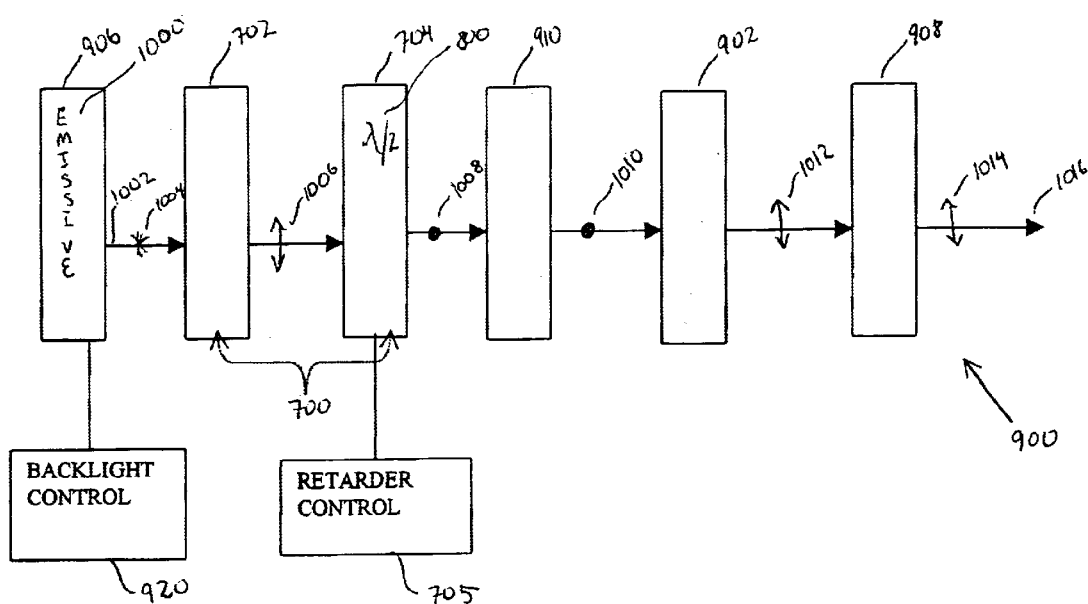
FIG. 10 is a schematic diagram of the LCD of FIG. 9, operating in the transmissive mode.

FIGS. 9 and 10 illustrate the operation of the LCD 900 which incorporates the tunable mirror 700. The elements of the LCD 900 are essentially the same as those in the previous figures, with the exception of the tunable mirror, and tunable mirror control. These elements are a liquid crystal cell 902 located in front of the 0–$\lambda/2$ retarder 704 of the tunable mirror 700; a backlight 906 which is located behind the reflective polarizer 702 of tunable mirror 700 and can be switched between emissive and non-emissive states of operation; a first polarizer 908 in front of the cell 902; a second polarizer 910 between the cell 902 and the retarder 704; and a control 920 for the backlight 906. Again, the liquid crystal cell 902 is assumed to be a 90° TN cell operating in a normally white mode, and in its ON state, wherein it rotates the plane of polarization of linearly polarized light by 90°. Also for the purpose of illustration, the first and second polarizers 908 and 910 have mutually orthogonal planes of polarization in the vertical and horizontal directions, respectively.

FIG. 9 illustrates the LCD 900 operating in the reflective mode, in which the retarder 704 is in the 0$\lambda$ state 708, and the backlight 906 is in its non-emissive state 926. First, randomly polarized ambient light 928, indicated by unpolarized light vectors 930, travels through the first polarizer 908, where it is linearly polarized, as indicated by the polarized light vector 932. The light then travels through the liquid crystal cell 902, where it is rotated to have a plane of polarization approximately parallel to the transmission axis of the second polarizer 910, as indicated by the polarized light vector 934, and passes through the second polarizer 910, maintaining its linear polarization 936. The light is then transmitted through the 0–$\lambda/2$ retarder 704 maintaining its linear polarization 938, and is reflected back by the reflective polarizer 702. The light then follows a reversed path with successive polarizations 940, 942, 944, 946, and 948 to emerge as an LCD output 950. (When the liquid crystal cell 902 is in its OFF state, the light entering through the first polarizer 908 travels through the cell 902, where it is rotated to have a plane of polarization approximately orthogonal to the transmission axis of the second polarizer 910, and is blocked.)

FIG. 10 illustrates the LCD 900 operating in the transmissive mode, in which the 0–λ/2 retarder 704 is in the λ/2 state 800, and the backlight 906 is in the emissive state 1000. First, randomly polarized backlight emission 1002, indicated by unpolarized light vectors 1004, is transmitted through the reflective polarizer 702, wherein only the vertical component is transmitted, as indicated by the polarized light vector 1006. Thereafter, the light passes through the retarder 704 wherein its polarization is rotated 90°, as indicated by polarized light vector 1008. The light then passes through the second polarizer 910 maintaining its linear polarization 1010. Its polarization is then rotated by the liquid crystal cell 902 to an approximately linear polarization 1012, parallel to the transmitting axis of the first polarizer 908. Finally the light passes through the first polarizer 908 with linear polarization 1014, to emerge as the LCD output 1016. (When the liquid crystal cell 902 is in its OFF state, the light exiting the cell 902 has a polarization direction orthogonal to the transmitting axis of the first polarizer 908 and is blocked).

Figure 11:
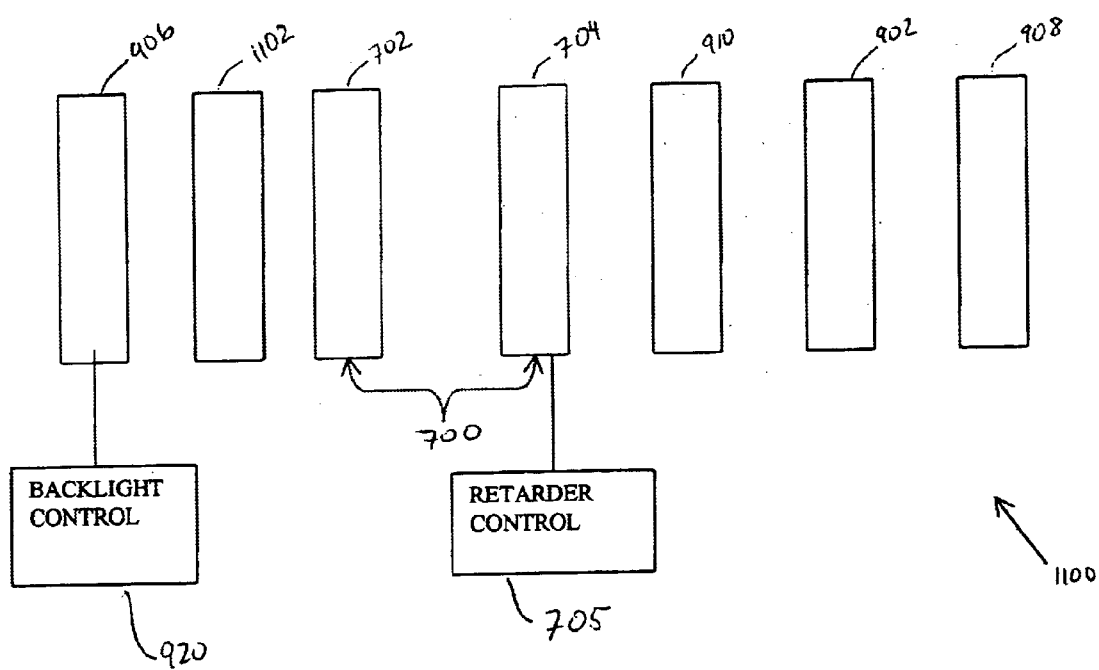
FIG. 11 is a schematic diagram of an alternate construction for an LCD with the tunable mirror of FIG. 7, which includes a $\lambda/4$ retarder.

FIG. 11 illustrates an LCD 1100, similar to the LCD 900 in which a λ/4 retarder 1102 is located between the backlight 906 and reflective polarizer 702. As is known in the art the placement of a λ/4 retarder 1120 between a backlight 906 and a reflective polarizer 702 can improve the brightness of the display. This is because horizontally polarized light not transmitted by the reflective polarizer 702 in the transmissive mode is reflected back through the λ/4 retarder 1120. The light is then circularly polarized in the right handed rotational direction, and is reflected back through the retarder as left handed circularly polarized light. The light then emerges through the retarder 1120 with vertical linear polarization, and passes through the reflective polarizer 702. (See Taber, U.S. Pat. No. 5,731,886).

Figure 12:
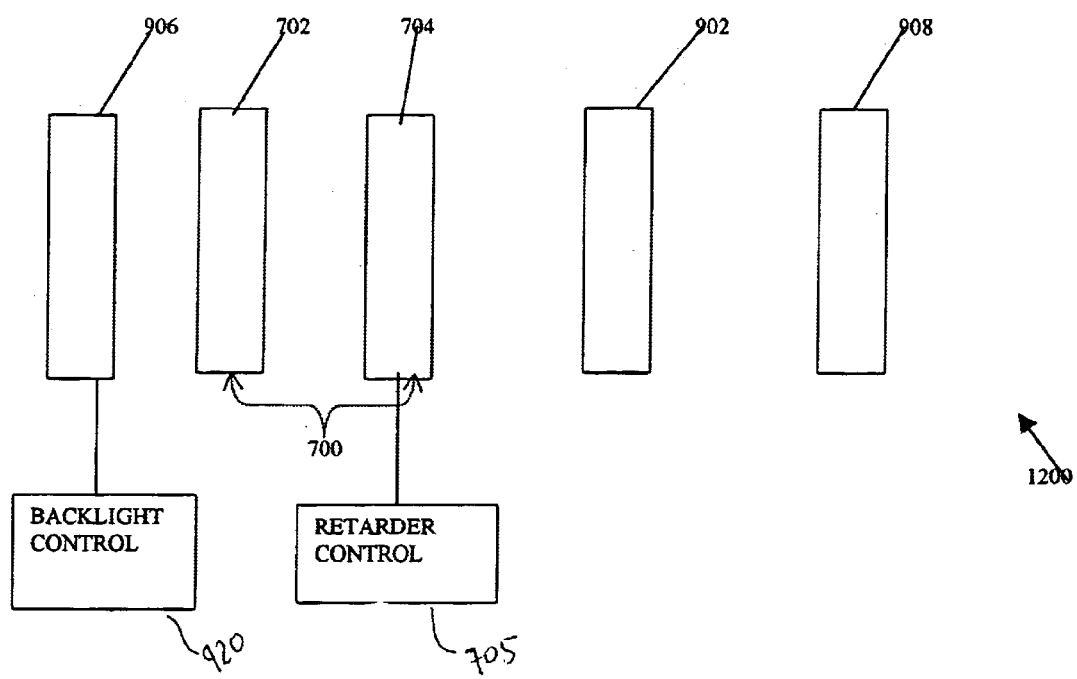
FIG. 12 is a schematic diagram of an alternate construction for the LCD with the tunable mirror of FIG. 8.

It is also possible to assemble the LCD 900 without the second polarizer 910. This is because the reflective polarizer 702 performs the function of the second polarizer 910 by filtering out the light not rotated by the liquid crystal cell. FIG. 12 illustrates this LCD assembly 1200.

FIGS. 13–17 illustrate a third tunable mirror assembly 1300, and LCDs 1500 and 1700 incorporating the tunable mirror 1300. The tunable mirror 1300 includes a cholesteric reflector 1302, a negative quarter-wave to positive quarter-wave (+/–λ/4) liquid crystal retarder 1304, and a control 1306 for the +/–λ/4 retarder.

The cholesteric reflector 1302 reflects circularly polarized light having a polarization of one rotational direction, and transmits circularly polarized light of the opposite rotational direction. The cholesteric reflector 1302 may be a diffuse reflecting cholesteric liquid crystal polymer film, which diffuses light. Such reflector may be made according to the process described in Wacker-Chemie, R. Maurer, F. H. Kreuzer, and J. Stohrer, "Cholesteric Reflectors with a Color Pattern", SID 94 Digest, p. 399 (1994).

The +/–λ/4 retarder functions similarly to the λ/4 retarder in that it converts light between circular and linear polarization forms. However, the +/–λ/4 retarder 1304 is controllably switchable between –λ/4 and +λ/4 states of operation, wherein the optical phase delay between the two states differs by half a wavelength (λ/2). In the +λ/4 state, the retarder 1304 converts horizontal or vertical linearly polarized light to right-handed or left-handed circularly polarized light, respectively. Conversely, it will convert right-handed or left handed circularly polarized light to horizontal or vertical linearly polarized light, respectively. In the –λ/4 state, the retarder 1304 converts horizontal or vertical linearly polarized light to left-handed or right-handed circularly polarized light, respectively, and conversely, it will convert right-handed or left handed circularly polarized light to vertical or horizontal linearly polarized light, respectively. Such retarder can be either of a nematic or ferroelectric type. The nematic type can be made by combining a λ/4 retarder with a 0–λ/2 wave retarder. There may be other ways of constructing a suitable tunable retarder. This invention contemplates the use of any suitable retarder which can be controllably switched between two states, with the optical phase delay between the two states differing by λ/2.

Furthermore the cholesteric reflector 1303 and retarder 1304 are oriented with respect to each other such that in the reflective mode, the cholesteric reflector 1302 reflects light received from the retarder 1304, as illustrated in FIGS. 13–17. Also, in FIGS. 13–17, the cholesteric reflector 1302 and +/–λ/4 retarder 1304 are illustrated as being separated, however, as components of an LCD, these elements would normally be bonded together.

Figure 13:
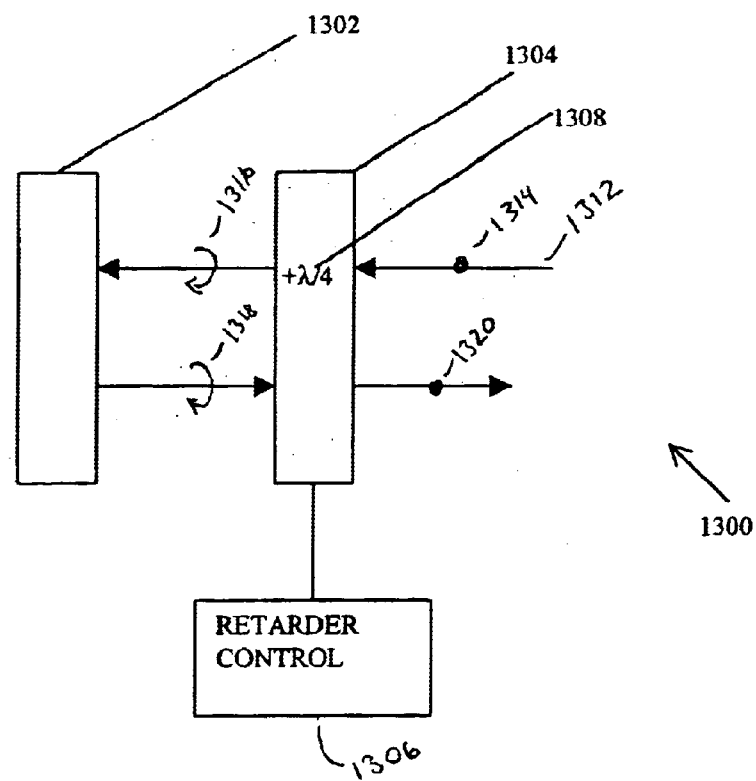
FIG. 13 is a schematic diagram of a tunable mirror comprising a cholesteric reflector with a negative quarter-wave to positive quarter-wave ($+/-\lambda/4$) tunable liquid crystal retarder, operating in the reflective mode.

FIG. 13 illustrates the operation of the tunable mirror 1300 in the reflective mode, in which the retarder 1304 is in the +λ/4 state 1308, for converting horizontal linearly polarized light to circularly polarized light of a right rotational direction. Also, the cholesteric reflector reflects right handed circularly polarized light and transmits left handed circularly polarized light. In the simplest case, light having horizontal linear polarization 1312 as indicated by the polarized light vector 1314, is transmitted through the retarder 1304 and converted to right handed circularly polarized light, as indicated by polarization vector 1316. The light is then reflected by the cholesteric reflector 1302, maintaining its polarization 1318, and is then linearly polarized back through the retarder 1304, to its original horizontal polarization 1320. It is also possible for the light entering to have both horizontal and vertical polarizations. In this case, still only the component having horizontal linear polarization will be converted into circularly right handed polarization and reflected back.

Figure 14:
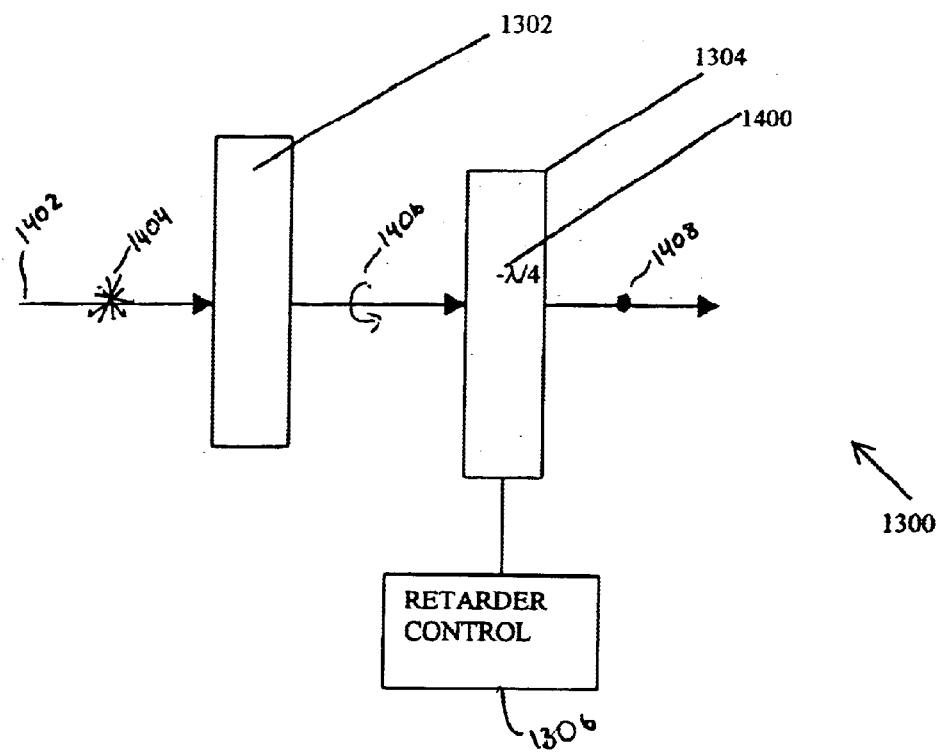
FIG. 14 is a schematic diagram of the tunable mirror of FIG. 13, operating in the transmissive mode.

FIG. 14 illustrates the operation of the tunable mirror 1300 in the transmissive mode, in which the +/–λ/4 retarder 1304 is in the –λ/4 state 1400. First, randomly polarized light 1402, as indicated by the unpolarized light vectors 1404 is transmitted through the cholesteric reflector 1302, wherein only the left handed circularly polarized component is transmitted, as indicated by the polarized light vector 1406. Thereafter, the light passes through the retarder 1304 wherein it is linearly polarized to a horizontal linear polarization 1408.

Figure 15:
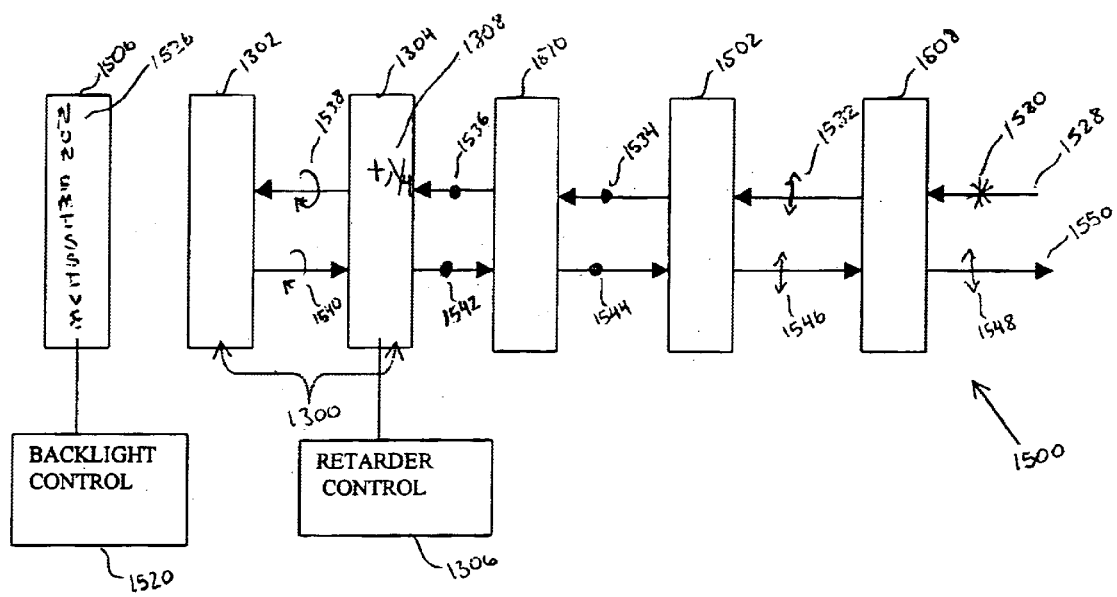
FIG. 15 is a schematic diagram of an LCD with the tunable mirror of FIG. 13, operating in the reflective mode.
Figure 16:
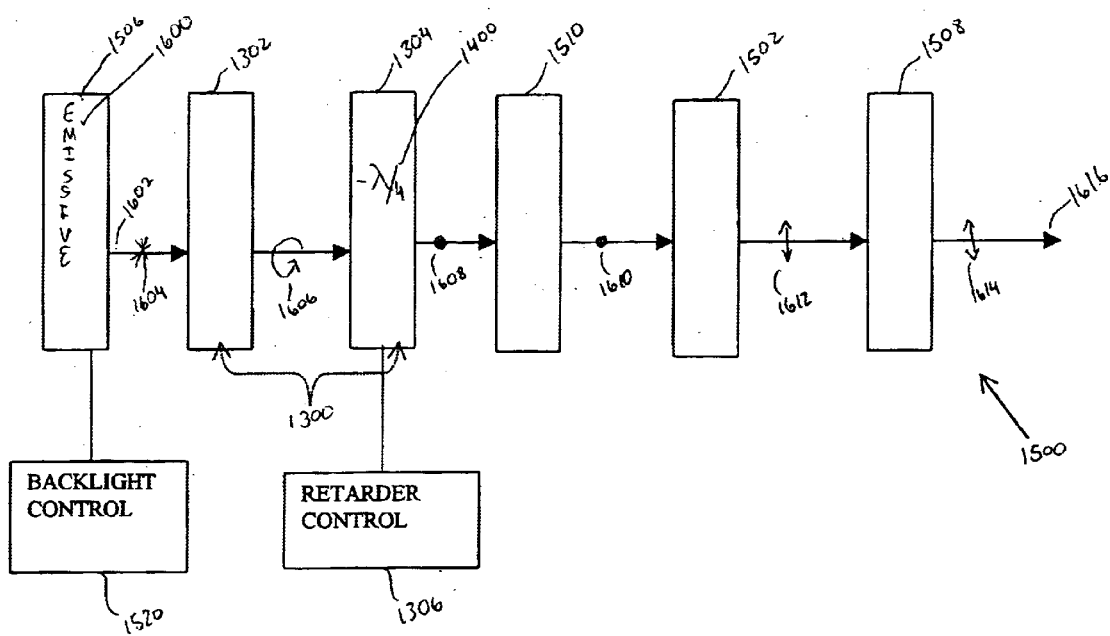
FIG. 16 is a schematic diagram of the LCD of FIG. 15, operating in the transmissive mode.

FIGS. 15 and 16 illustrate the operation of the LCD 1500 which incorporates the tunable mirror 1300. The elements of the LCD 1500 are essentially the same as those in the previous figures, with the exception of the tunable mirror and tunable mirror control. These elements are a liquid crystal cell 1502 located in front of the +/–λ/4 retarder 1304 of the tunable mirror 1300; a backlight 1506 which is located behind the cholesteric reflector 1302 of tunable mirror 1300 and can be switched between emissive and non-emissive states; a first polarizer 1508 in front of the cell 1502; a second polarizer 1510 between the cell 1502 and the +/–λ/4 retarder 1304; and a control 1520 for the backlight 1506. Again, the liquid crystal cell 1502 is assumed to be a 90° TN cell operating in a normally white mode, and in its ON state wherein it rotates the plane of polarization of linearly polarized light by 90°. Also, for the purpose of illustration, the first and second polarizers 1508 and 1510 have mutually orthogonal planes of polarization 1522 and 1524 in the vertical and horizontal directions, respectively.

FIG. 15 illustrates the LCD 1500 operating in the reflective mode, in which the +/−λ/4 retarder 1304 is in the +λ/4 state 1308, and the backlight 1506 is in the non-emissive state 1526. First, randomly polarized ambient light 1528, indicated by unpolarized light vectors 1530, travels through the first polarizer 1508, and is linearly polarized, as indicated by the polarized light vector 1532. The light then travels through the liquid crystal cell 1502, where it is rotated (approximately 90°) to have a plane of polarization approximately parallel to the transmission axis of the second polarizer, as indicated by the polarized light vector 1534, and then passes through the second polarizer 1510, maintaining its linear polarization 1536. The light is then transmitted through the retarder 1304 and is circularly polarized in the right handed direction, as indicated by polarization vector 1538. Thereafter, the light is reflected back by the cholesteric reflector 1302. The light then follows a reversed path with successive polarizations 1540, 1542, 1544, 1546, and 1548 to emerge as an LCD output 1550.

(When the liquid crystal cell is in its OFF state, the light entering through the first polarizer 1508 travels through the cell 1502, where it is rotated to have a plane of polarization approximately orthogonal to the transmission axis of the second polarizer 1510 and is blocked.)

FIG. 16 illustrates the LCD 1500 operating in the reflective mode, in which the retarder 1304 is in the −λ/4 state 1400, and the backlight 1506 is in the emissive state 1600. First, randomly polarized backlight emission 1602, indicated by unpolarized light vectors 1604, is transmitted through the reflective polarizer 1302, wherein only the left handed circularly polarized component is transmitted, as indicated by the polarized light vector 1606. Thereafter, the light passes through the retarder 1304 wherein it is linearly polarized to a horizontal linear polarization 1608. The light then passes through the second polarizer 1510 maintaining its linear polarization 1610. Its polarization is then rotated by the liquid crystal cell 1502 to an linear polarization 1612, approximately parallel to the transmitting axis of the first polarizer 1508. Finally the light passes through the first polarizer 1508 with linear polarization 1614, to emerge as the LCD output 1616. (When the cell is in its OFF state, the light exiting the liquid crystal cell 1502, has a polarization direction orthogonal to the transmitting axis of the first polarizer 1508 and is blocked).

As is known in the art, (see Taber, U.S. Pat. No. 5,731,886) the right handed light that is reflected from the cholesteric reflector 1302 will undergo a 180° phase change upon reflection from the backlight surface causing the right handed circular polarization to change to left handed circular polarization which improves the brightness of the display.

Figure 17:
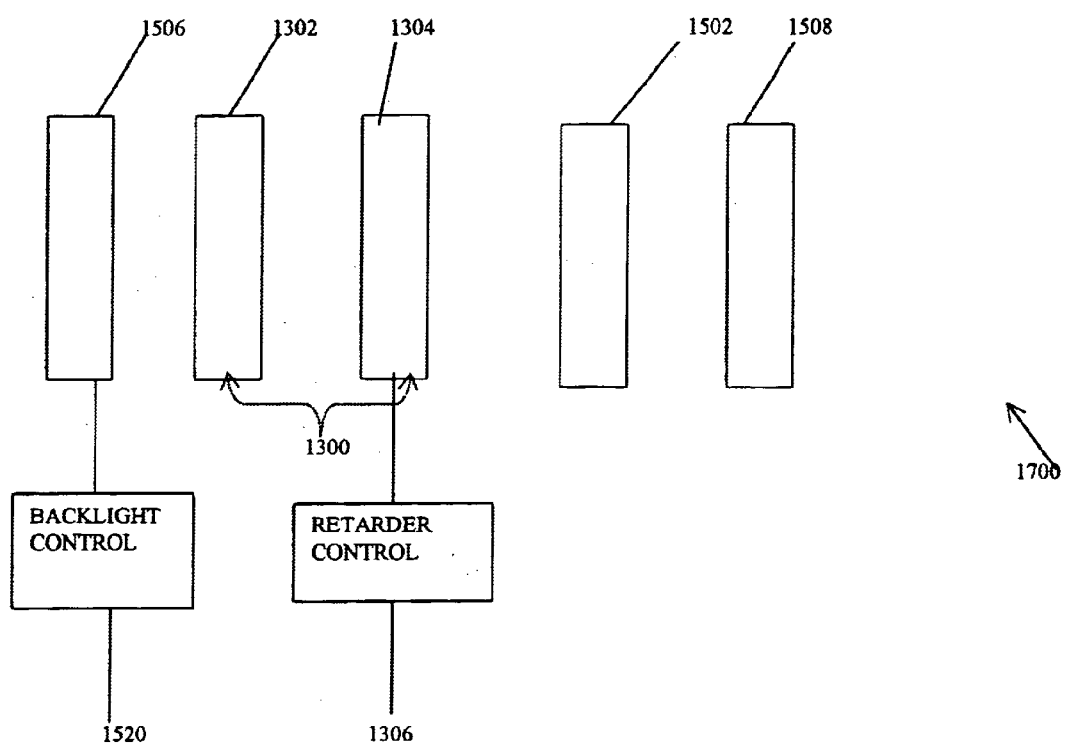
FIG. 17 is a schematic diagram of an alternate construction for the LCD with the tunable mirror of FIG. 13.
Figure 18:
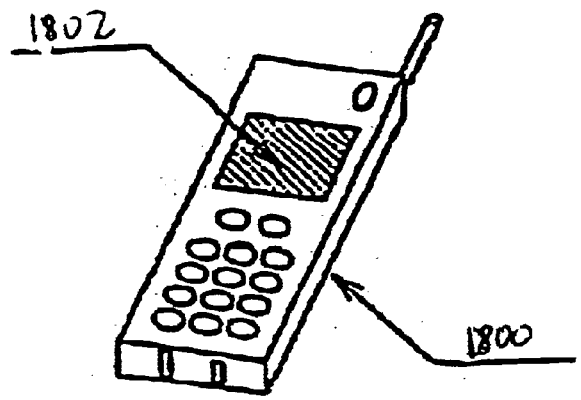
Figure 18:
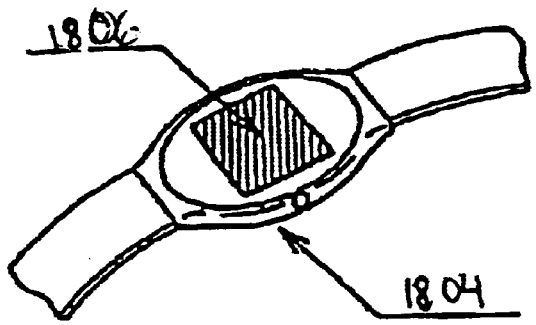
Figure 18:
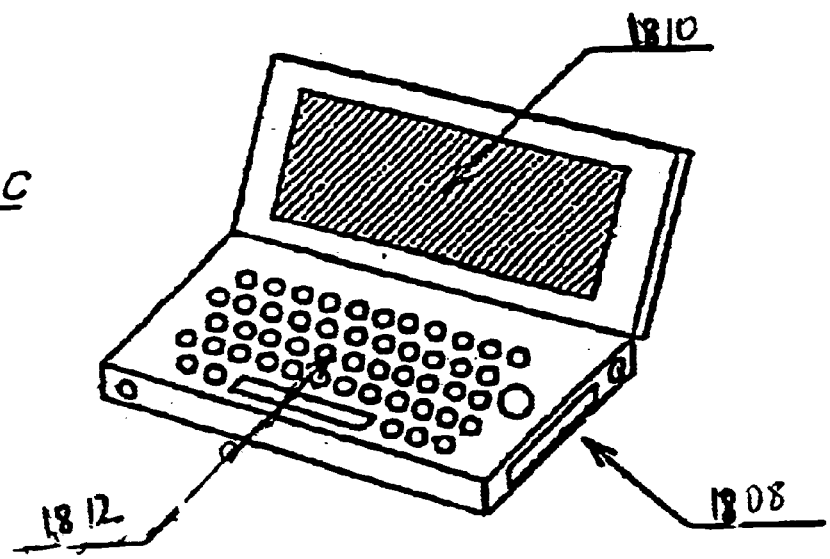

It is also possible to assemble the LCD 1500 without the second polarizer 1510. This is because the cholesteric reflector 1302 performs the function of the second polarizer 1510 by filtering out the light not rotated by the liquid crystal cell. FIG. 17 illustrates this LCD assembly 1700.

In addition to the reflective and transmissive modes described, the LCD and tunable mirror may optionally include an intermediate mode of operation, in which the tunable mirror and backlight are operated at intermediate states.

An LCD with a tunable mirror according to any of the embodiments described above may be incorporated into many types of operating systems, including but not limited to: Global Positioning Satellite (GPS) receiver units; computers including the laptop and notepad units; personal digital assistants; calculators; personal calendars; cellular telephones; watches and clocks; automobile, aircraft, and boat displays.

Figure 18A:
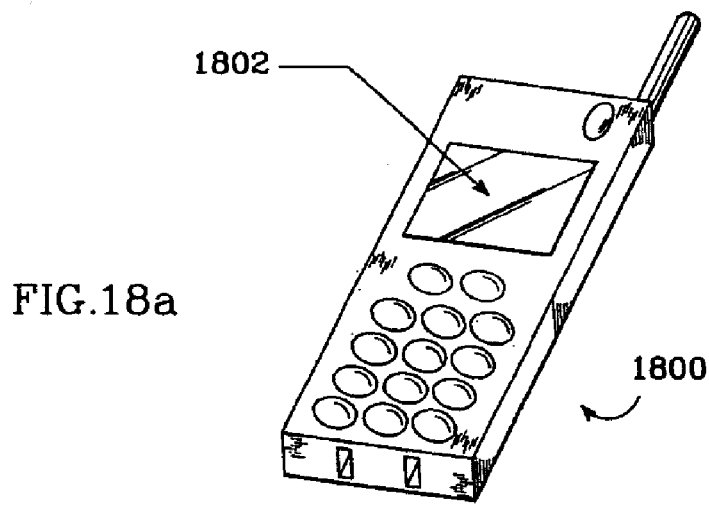
Figure 18B:
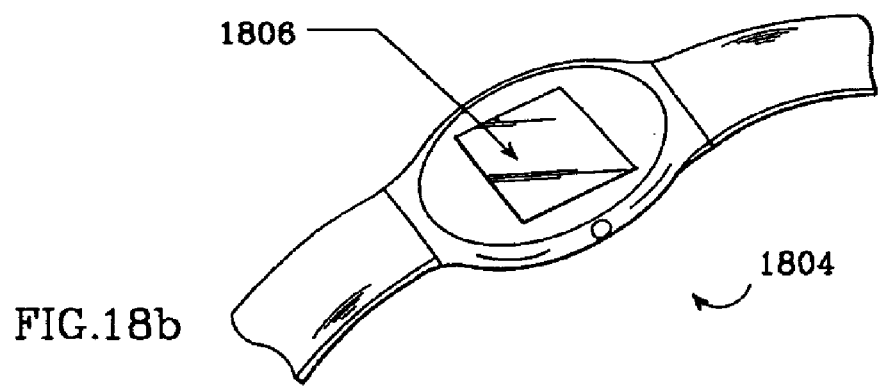
Figure 18C:
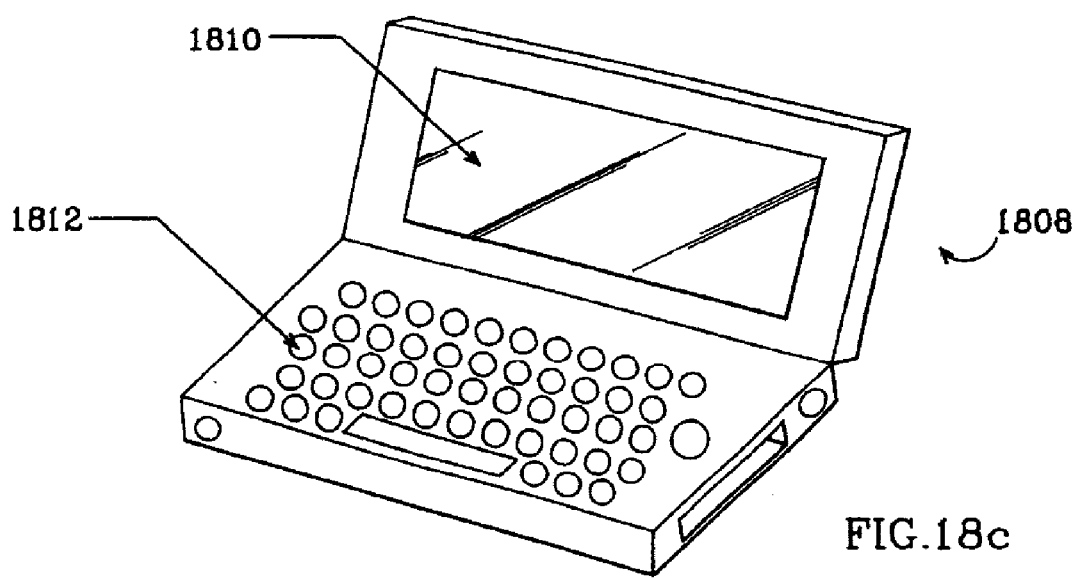

Three examples of operating systems embodying the present invention are shown in FIGS. 18*a*–18*c*. FIG. 18*a* is a cellular telephone 1800 with an LCD 1802, according to the present invention. FIG. 18*b* is a watch 1804 with an LCD 1806, according to the present invention, and FIG. 18*c* is a laptop 1808 with an LCD screen 1810 according to the present invention, attached to the keypad section 1812. Since cellular telephones, watches and laptops can be battery operated, using an LCD in accordance with the present invention is desirable as it saves battery life, as well as increase the contrast and brightness of the display.

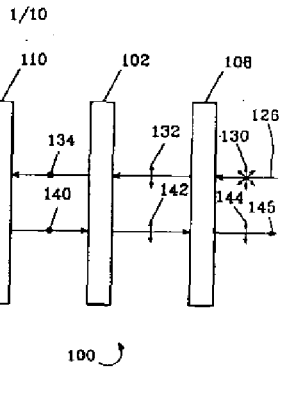

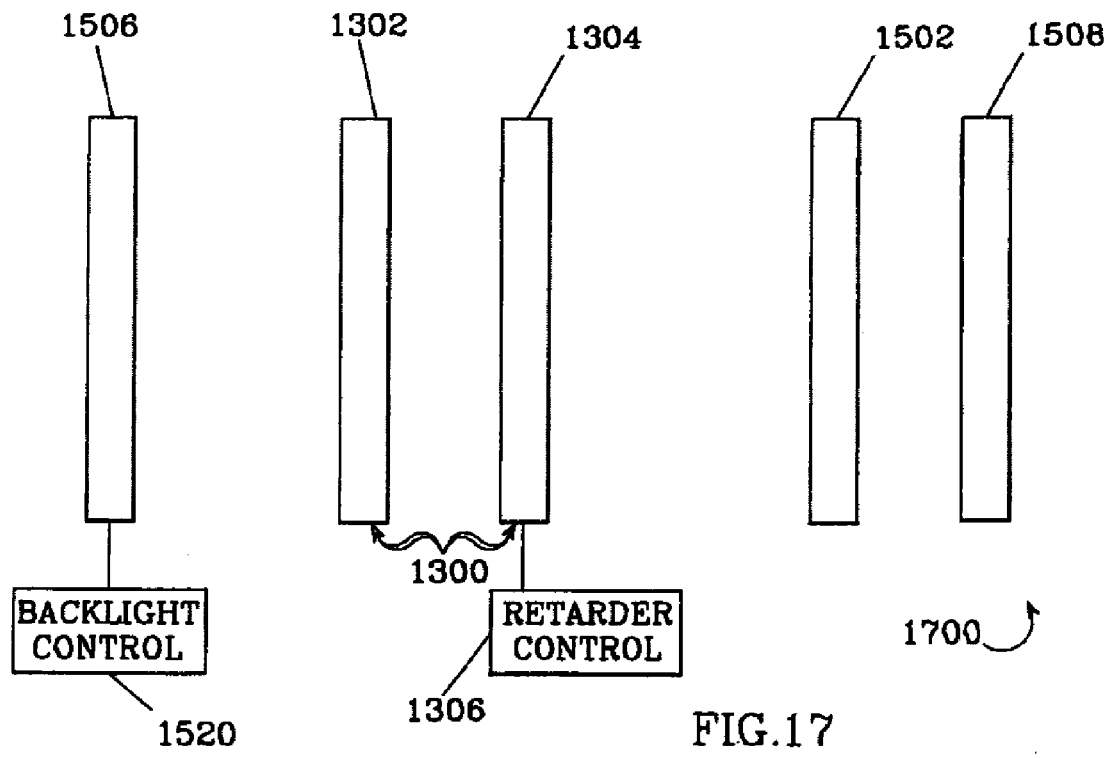

We claim:

1. A liquid crystal display (LCD), comprising:

a liquid crystal cell;

a tunable mirror, optically aligned with the liquid crystal cell, having controllable reflective and transmissive modes, such that in the reflective mode the tunable mirror primarily reflects light received from the liquid crystal cell back through the cell, and in the transmissive mode the mirror primarily transmits light towards the liquid crystal cell;

a backlight on a side of the tunable mirror opposite the liquid crystal cell, the backlight being controllably switchable between emissive and non-emissive states of operation, for providing backlighting the LCD in the emissive state of operation; and wherein said tunable mirror is further operable at at least one intermediate mode in which it partially reflects light received from the liquid crystal cell back through the cell, and partially transmits light received from the backlight towards the liquid crystal cell; and said backlight is further operable at at least one intermediate state of operation in which it partially illuminates the LCD.

2. A liquid crystal display (LCD), comprising:

a liquid crystal cell;

a tunable mirror, optically aligned with the liquid crystal cell, having controllable reflective and transmissive modes, such that in the reflective mode the tunable mirror primarily reflects light received from the liquid crystal cell back through the cell, and in the transmissive mode the mirror primarily transmits light towards the liquid crystal cell;

a backlight on a side of the tunable mirror opposite the liquid crystal cell, the backlight being controllably switchable between emissive and non-emissive states of operation, for providing backlighting the LCD in the emissive state of operation;

wherein the tunable mirror comprises:

a tunable retarder, being controllably switchable between first and second states of operation, the optical phase delay of the two states differing by λ/2; and a cholesteric reflector optically aligned with the retarder on a side opposite the liquid crystal cell, for reflecting light received from the retarder in the first state, and for transmitting light through the retarder in the second state such that the tunable mirror operates in the reflective mode when the retarder is in the first state, and in the transmissive mode when the retarder is in the second state; and wherein the tunable retarder is a negative quarter-wave to positive quarter-wave (+/−$\lambda$/4) retarder, controllably switchable between −$\lambda$/4 and +$\lambda$/4 states of operation, whereby in the +$\lambda$/4 state, said retarder converts linearly polarized light of a second linear direction to circularly polarized light of a second rotational direction, and converts circularly polarized light of the second rotational direction to linearly polarized light of the second linear direction and, in the −$\lambda$/4 state, said retarder converts circularly polarized light of a first rotational direction to linearly polarized light of the second linear direction; and whereby said cholesteric reflector reflects circularly polarized light of the second rotational direction and transmits a component of randomly polarized light having a circular polarization of the first rotational direction, such that the tunable mirror operates in the reflective mode when the +/−$\lambda$/4 retarder is in the +$\lambda$/4 state, and in the transmissive mode when the +/−$\lambda$/4 retarder is in the −$\lambda$/4 state.

3. The LCD of claim 2, wherein the +/−$\lambda$/4 retarder comprises a quarter-wave ($\lambda$/4) retarder optically aligned with a zero to half-wave (0–$\lambda$/2) retarder.

4. The LCD of claim 2, wherein the cholesteric reflector is a diffuse reflecting cholesteric liquid crystal polymer film.

5. The LCD of claim 2, wherein the +/−$\lambda$/4 retarder is a ferroelectric liquid crystal retarder.

6. A method of operating a liquid crystal display (LCD), comprising:

primarily reflecting light entering a first side of a liquid crystal cell and exiting a second side of the liquid crystal cell back through the liquid crystal cell when the amount of light entering from the first side of the liquid crystal cell is above a viewability threshold;

generating and primarily transmitting a backlight emission from the second side of the liquid crystal cell through the liquid crystal cell when approximately no light enters the first side of the liquid crystal cell; and partially reflecting light entering a first side of a liquid crystal cell and exiting a second side of the liquid crystal cell back through the liquid crystal cell, and generating and partially transmitting a backlight emission from the second side of the liquid crystal cell through the liquid crystal cell when light entering from the first side of the liquid crystal cell falls below said viewability threshold, said backlight emission being generated in an amount sufficient to supplement the reflected light such that it reaches said viewability threshold.

* * * * *

UNITED STATES PATENT AND TRADEMARK OFFICE
CERTIFICATE OF CORRECTION

PATENT NO. : 6,710,831 B1
DATED : March 23, 2004
INVENTOR(S) : Bruce Winker et al.

It is certified that error appears in the above-identified patent and that said Letters Patent is hereby corrected as shown below:

Delete Title page illustrating a Drawing Figure, and substitute therefor Title page illustrating a Drawing Figure. (Attached)

Delete Drawing Sheets 1-10, to be replace with Drawing Sheets 1-10. (Attached)

Title page,
Item [56], References Cited, OTHER PUBLICATIONS, delete the following:
"Saji, T., et al., "Short-Term Hemodynamic Effect of a New Oral PG12 Analogue, Beraprost, in primary and Secondary Pulmonary Hypertension," Am.J. Cardio. 78:244-247 (1996)
Sakoda, T., et al., "Myristoylation of endothelial cell nitric oxide synthase is important for extracellular release of nitric oxide," Mol. Cell. Biochem. 152:143-148 (1995).
Sandig, V., and Strauss, M., "Liver-directed gene transfer and application to therapy," J. Mol. Med. 74:205-212 (1996)."
Below ABSTRACT, "6 Claims, 18 Drawing Sheets" should read -- 9 Claims, 10 Drawing Sheets --.

Column 14,
Line 25, add claims 7-9 as follows:

```
    7.   A tunable mirror comprising:
    a   negative  quarter-wave  to  positive  quarter-wave   (+/-λ/4)
retarder, being controllably switchable between -λ/4 and +λ/4 states of
operation,
        whereby in the +λ/4 state, said retarder circularly polarizes
linearly polarized light of a first linear direction to circularly
polarized light of a first rotational direction, and linearly polarizes
circularly  polarized  light  of  the  first  rotational  direction  to
linearly polarized light of the first linear direction, and, in the -λ/4
state, said retarder linearly polarizes circularly polarized light of a
second rotational direction to linearly polarized light of the first
linear direction; and
        a  cholesteric  reflector  optically  aligned  with  the  +/-  λ/4
retarder, for reflecting circularly polarized light received from the
+/-  λ/4  retarder  having  a  polarization  of  the  first  rotational
direction,  back  through  the  +/-  λ/4  retarder,  and  transmitting
circularly polarized light of the second rotational direction towards
the +/- λ/4 retarder,
        such that the tunable mirror reflects linearly polarized light of
the first linear direction, received through the +/- λ/4 retarder from a
side opposite the cholesteric reflector when the +/- λ/4 retarder is in
the +λ/4 state, and transmits circularly polarized light of the second
rotational direction received through the cholesteric reflector, on a
side opposite the  +/- λ/4 retarder when the +/- λ/4 retarder is in the
-λ/4 state.
```

UNITED STATES PATENT AND TRADEMARK OFFICE
CERTIFICATE OF CORRECTION

PATENT NO. : 6,710,831 B1
DATED : March 23, 2004
INVENTOR(S) : Bruce Winker et al.

It is certified that error appears in the above-identified patent and that said Letters Patent is hereby corrected as shown below:

Column 14 (cont'd),

8. The tunable mirror of claim 7, wherein the cholesteric reflector is a diffuse reflecting cholesteric liquid crystal film.

9. The tunable mirror of claim 8, wherein the +/- $\lambda/4$ retarder comprises a $0-\lambda/2$ retarder and a $\lambda/4$ retarder.

Signed and Sealed this

Thirtieth Day of November, 2004

JON W. DUDAS
*Director of the United States Patent and Trademark Office*

(12) United States Patent
Winker et al.

(10) Patent No.: US 6,710,831 B1
(45) Date of Patent: Mar. 23, 2004

(54) HIGH BRIGHTNESS TRANSFLECTIVE LCD AND METHOD USING TUNABLE MIRROR

(75) Inventors: Bruce Winker, Ventura, CA (US); William J. Gunning, Newbury Park, CA (US)

(73) Assignee: Rockwell Scientific Licensing, LLC, Thousand Oaks, CA (US)

( * ) Notice: Subject to any disclaimer, the term of this patent is extended or adjusted under 35 U.S.C. 154(b) by 300 days.

(21) Appl. No.: 09/676,138

(22) Filed: Sep. 29, 2000

(51) Int. Cl.[7] ............................................. G02F 1/13
(52) U.S. Cl. ...................................................... 349/115
(58) Field of Search ........................... 349/115, 77, 74, 349/113, 114

(56) References Cited

U.S. PATENT DOCUMENTS

| | | | |
|---|---|---|---|
| 4,093,356 A | 6/1978 | Bigelow | 350/338 |
| 4,398,805 A | 8/1983 | Cole | 350/345 |
| 5,146,355 A | 9/1992 | Prince et al. | 359/50 |
| 5,182,663 A * | 1/1993 | Jones | 349/113 |
| 5,504,603 A | 4/1996 | Winker et al. | 359/73 |
| 5,612,801 A * | 3/1997 | Winker | 349/119 |
| 5,731,886 A | 3/1998 | Taber et al. | 359/65 |
| 5,796,454 A | 8/1998 | Ma | 349/98 |
| 5,808,711 A | 9/1998 | Suppelsa et al. | 349/74 |
| 5,923,456 A | 7/1999 | Tench et al. | 359/266 |
| 5,982,465 A | 11/1999 | Saxena et al. | 349/119 |
| 6,008,871 A | 12/1999 | Okumura | 349/61 |
| 6,039,451 A | 3/2000 | Grave | 362/29 |
| 6,144,359 A | 11/2000 | Grave | 345/102 |
| 6,437,900 B1 * | 8/2002 | Cornelissen et al. | 359/246 |

FOREIGN PATENT DOCUMENTS

| | | | |
|---|---|---|---|
| JP | 05203937 A1 * | 8/1993 | 349/113 |
| JP | 10206844 | 7/1998 | |
| JP | 2000221544 | 11/2000 | |
| WO | WO3701789 | 1/1997 | |
| WO | WO9838547 | 9/1998 | |
| WO | WO0063745 | 10/2000 | |

OTHER PUBLICATIONS

Machine translation of 10-206844 pp. 1-20.*
Saji, T., et al., "Short-Term Hemodynamic Effect of a New Oral $PGI_2$ Analogue, Beraprost, in Primary and Secondary Pulmonary Hypertension," *Am. J. Cardio.* 78:244–247 (1996).
Sakoda, T., et al., "Myristoylation of endothelial cell nitric oxide synthase is important for extracellular release of nitric oxide," *Mol. Cell. Biochem.* 152:143–148 (1995).
Sandig, V., and Strauss, M., "Liver-directed gene transfer and application to therapy," *J. Mol. Med.* 74:205–212 (1996).
*Polarization Manipulation with Retarders*, Meadowlark Optics, p. 5.
*Polarization Spoken Here*, Meadowlark Optics, Nov. 6, 2000.
*Retarders*, Polarization Manipulation with Retarders, Meadowlark Optics, Jul. 20, 2000, p. 1–3.
*Seminar M–12; Supertwisted–Nematic LCDs*, Scheffer and Nehring, p. M–12/3–M12/39.
*Cholesteric Reflectors With a Color Pattern*, Wacker–Chemie Maurer, Kreuzer and Stohrer, SID 94 Digest, p. 399–402.

(List continued on next page.)

*Primary Examiner*—James A. Dudek
(74) *Attorney, Agent, or Firm*—Koppel, Jacobs, Patrick & Heyblk

(57) ABSTRACT

A Liquid Crystal Display (LCD) uses a tunable mirror in place of a partially reflective mirror. The tunable mirror has a controllable reflectivity and transmitance which allows the mirror to primarily reflect light when the LCD is operated in a reflective mode, and to primarily transmit light from a backlight when the LCD is operated in a transmissive mode.

6 Claims, 18 Drawing Sheets